US012702998B2

(12) United States Patent
Jeon et al.

(10) Patent No.: US 12,702,998 B2
(45) Date of Patent: Aug. 11, 2026

(54) LIQUID SUPPLY UNIT HAVING TANK PROVIDED WITH CIRCULATION LINE, APPARATUS FOR TREATING SUBSTRATE, INCLUDING THE SAME, AND METHOD OF TREATING SUBSTRATE

(71) Applicant: SEMES CO., LTD., Cheonan-si (KR)

(72) Inventors: In Ryu Jeon, Cheonan-si (KR); Mu Hyeon Lee, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 408 days.

(21) Appl. No.: 18/080,629

(22) Filed: Dec. 13, 2022

(65) Prior Publication Data

US 2023/0182164 A1 Jun. 15, 2023

(30) Foreign Application Priority Data

Dec. 14, 2021 (KR) ........................ 10-2021-0178482

(51) Int. Cl.
*B05C 11/10* (2006.01)
*B05C 5/00* (2006.01)
*B05C 5/02* (2006.01)

(52) U.S. Cl.
CPC ................ *B05C 5/001* (2013.01); *B05C 5/02* (2013.01); *B05C 11/1039* (2013.01)

(58) Field of Classification Search
CPC ....... B05C 9/14; B05C 5/001; B05C 11/1039; B05C 11/1042; B08B 7/0092; H01J 2237/002; H01J 37/32724; G03F 1/82; G03F 7/70295; G03F 7/162; G03F 7/168
See application file for complete search history.

(56) References Cited

U.S. PATENT DOCUMENTS

| | | | | |
|---|---|---|---|---|
| 2,850,325 | A * | 9/1958 | Suess | F23D 14/78 239/71 |
| 6,453,992 | B1 * | 9/2002 | Kim | C23C 16/45565 118/724 |
| 6,639,196 | B1 * | 10/2003 | Fiala | F27B 5/16 118/724 |
| 12,297,545 | B2 * | 5/2025 | Hwang | H01L 21/67051 |
| 2013/0220478 | A1 * | 8/2013 | Kasahara | B65B 3/04 141/2 |

(Continued)

FOREIGN PATENT DOCUMENTS

| | | |
|---|---|---|
| JP | 2017-069331 | 4/2017 |
| JP | 2019192864 | 10/2019 |

(Continued)

OTHER PUBLICATIONS

Office Action from the Korean Intellectual Property Office dated Jun. 30, 2023.

*Primary Examiner* — Karl Kurple

(57) ABSTRACT

Disclosed is a method of treating a substrate, the method including: adjusting a temperature of a treatment liquid by heating the treatment liquid with a heater unit installed in the circulation line while circulating the treatment liquid in a housing of a tank through a circulation line coupled to the housing; treating a substrate by supplying a temperature-controlled treatment liquid to the substrate in a normal mode; and discharging a treatment liquid in the circulation line to the outside of the circulation line through a drain line connected to the circulation line in an emergency mode.

7 Claims, 20 Drawing Sheets

(56) References Cited

U.S. PATENT DOCUMENTS

| | | | | |
|---|---|---|---|---|
| 2015/0377571 | A1* | 12/2015 | Hiroki | H01J 37/32724 165/296 |
| 2016/0035597 | A1* | 2/2016 | Hinode | H01L 21/6708 216/84 |
| 2017/0256397 | A1* | 9/2017 | Goshi | H01L 21/67034 |
| 2019/0091640 | A1* | 3/2019 | Nishide | H01L 21/32134 |
| 2019/0131144 | A1* | 5/2019 | Iwahata | B08B 3/14 |
| 2020/0066557 | A1* | 2/2020 | Lee | H01J 37/32715 |
| 2020/0098594 | A1* | 3/2020 | Kiyohara | H01L 21/67034 |
| 2020/0144052 | A1* | 5/2020 | Goshi | H01L 21/67034 |
| 2020/0318230 | A1* | 10/2020 | Nomoto | G03F 7/70758 |
| 2020/0357662 | A1* | 11/2020 | Muta | H01L 21/67017 |
| 2022/0199432 | A1* | 6/2022 | Lee | H01L 21/67057 |
| 2023/0003786 | A1* | 1/2023 | Tustaniwskyj | H01L 23/46 |
| 2023/0028053 | A1* | 1/2023 | Kiyohara | H01L 21/67017 |
| 2023/0187232 | A1* | 6/2023 | Lee | H01L 21/67248 134/105 |
| 2023/0203672 | A1* | 6/2023 | Hwang | B08B 3/08 216/93 |
| 2023/0340656 | A1* | 10/2023 | Forseth | B22F 12/86 |
| 2024/0216942 | A1* | 7/2024 | Jeong | H01L 21/67017 |

FOREIGN PATENT DOCUMENTS

| | | |
|---|---|---|
| KR | 10-2008-0060786 | 7/2008 |
| KR | 10-2017-0076237 | 7/2017 |
| KR | 10-2017-0139453 | 12/2017 |
| KR | 10-2232835 | 3/2021 |

* cited by examiner

LIQUID SUPPLY UNIT HAVING TANK PROVIDED WITH CIRCULATION LINE, APPARATUS FOR TREATING SUBSTRATE, INCLUDING THE SAME, AND METHOD OF TREATING SUBSTRATE

CROSS-REFERENCE TO RELATED APPLICATIONS

This application claims priority to and the benefit of Korean Patent Application No. 10-2021-0178482 filed in the Korean Intellectual Property Office on Dec. 14, 2021, the entire contents of which are incorporated herein by reference.

TECHNICAL FIELD

The present invention relates to a substrate treating method and a substrate treating apparatus, and more particularly, to a liquid supply unit for supplying a high-temperature liquid to a substrate, and a substrate treating apparatus and a substrate treating method.

BACKGROUND ART

A semiconductor process includes a process of cleaning a thin film, foreign substances, particles, and the like on a substrate. These processes are performed by placing the substrate on a spin head so that a pattern side faces up or down, supplying a treatment liquid to the substrate while rotating the spin head, and then drying the wafer.

Recently, a high-temperature liquid, such as an aqueous phosphoric acid solution, is used as a treatment liquid. For example, an aqueous solution of phosphoric acid includes phosphoric acid and water. The liquid supply unit has a supply tank, a liquid supply line, and a nozzle. The supply tank is adjusted so that the temperature of the aqueous phosphoric acid solution and the concentration of phosphoric acid meet the process conditions. The aqueous phosphoric acid solution with the adjusted concentration and temperature is supplied from the supply tank to the nozzle through the liquid supply line.

FIG. 1 is a diagram schematically illustrating an example of a supply tank 900. Referring to FIG. 1, the supply tank 900 includes a housing 920 and a circulation line 940. In addition, the housing 920 is connected with a liquid inlet line 960 through which liquid is supplied to the housing 920 from the outside, a waste liquid discharge line 950 for discharging a waste liquid in the housing 920, and a vent line 970 for exhausting water vapor vaporized in the housing 920.

A pump 942 and a heater 944 are installed in the circulation line 940. An aqueous phosphoric acid solution in the housing 920 is heated by the heater 944 while flowing along the circulation line 940. Water is vaporized from the aqueous phosphoric acid solution by heating while the aqueous phosphoric acid solution is circulated through the circulation line 940, so that the concentration of phosphoric acid in the aqueous phosphoric acid solution is adjusted.

In general, since phosphoric acid is supplied to the substrate at a temperature higher than 150° C., the heater 944 maintains a very high temperature. However, when an emergency situation occurs in the device during the process, the operation of both the pump 942 and the heater 944 is stopped. Emergency situations occur in various cases, such as when the treatment liquid leaks during the process, or when the temperature or flow rate of the treatment liquid is out of the set range.

When an emergency situation occurs while the aqueous phosphoric acid solution is circulated through the circulation line 940 and the pump 942 is stopped, the temperature of the aqueous solution of phosphoric acid remaining in the circulation line 940 may be increased to 200° C. or more due to the residual heat of the heater 944. In this case, components that are in contact with the hot aqueous phosphoric acid solution may be damaged. When the component used for connecting the port provided to the heater 942 and the pipe is damaged, the aqueous phosphoric acid solution may leak from the circulation line 940.

SUMMARY OF THE INVENTION

The present invention has been made in an effort to provide a substrate treating apparatus and method capable of preventing a liquid from being heated to a high temperature by residual heat of a heater in a circulation line provided in a tank even when an emergency situation occurs in the apparatus and the operation of the pump is stopped, and a liquid supply unit used therefor.

The object of the present invention is not limited thereto, and other objects not mentioned will be clearly understood by those of ordinary skill in the art from the following description.

Another exemplary embodiment of the present invention provides an apparatus for treating a substrate, the apparatus comprising: a cup providing a treatment space therein; a support unit for supporting a substrate and rotating the substrate in the treatment space; a nozzle for supplying a treatment liquid to the substrate; and a liquid supply unit for supplying the treatment liquid to the nozzle, in which the liquid supply unit includes a tank for storing the treatment liquid, and the tank includes: a housing having a space for storing the treatment liquid therein; a circulation line coupled to the housing to circulate the treatment liquid in the housing; a heater unit installed in the circulation line to heat the treatment liquid; and a drain line for discharging the treatment liquid remaining in the circulation line and including a drain valve installed.

According to the exemplary embodiment, the liquid supply unit may further include a cooling gas supply line which supplies cooling gas to the heater unit and in which a cooling valve is installed.

According to the exemplary embodiment, the cooling gas supply line may be coupled to the circulation line.

According to the exemplary embodiment, the cooling gas supply line may be coupled to the circulation line downstream of the heater unit.

According to the exemplary embodiment, the cooling gas supply line may be connected to the circulation line to supply the cooling gas in a direction toward the heater unit.

According to another exemplary embodiment, the cooling gas supply line may be coupled to the housing.

According to the exemplary embodiment, a pump unit may be installed in the circulation line, and the drain line may be connected to the circulation line between the pump unit and the heater unit.

According to the exemplary embodiment, the circulation line may include: a first line of which a longitudinal direction is provided in a vertical direction; a second line extending from the first line and connected to the housing so as to be provided upstream of the first line; and a third line extending from the first line and coupled to the housing so as to be provided downstream of the first line, and a pump unit may be installed in the first line, the cooling gas supply line may be connected to the third line, and the drain line may be connected to the first line.

According to the exemplary embodiment, the cooling gas supply line may be coupled to the housing, and a vent line for exhausting an internal atmosphere may be coupled to the housing.

According to the exemplary embodiment, the apparatus may further include a controller for controlling the liquid supply unit, in which the controller may control the liquid supply unit to heat the treatment liquid with the heater unit while circulating the treatment liquid in the housing through the circulation line in a state in which the drain valve is closed in a normal mode, and to change a state of the drain valve to an open state to discharge the treatment liquid remaining in the circulation line to the drain line in an emergency mode, and in the emergency mode, the operation of the pump unit may be stopped.

According to the exemplary embodiment, the apparatus may further include a controller for controlling the liquid supply unit, in which the controller may control the liquid supply unit to heat the treatment liquid with the heater unit while circulating the treatment liquid in the housing through the circulation line in a state in which the drain valve is closed in a normal mode, and to change a state of the drain valve to an open state to discharge the treatment liquid remaining in the circulation line to the drain line, and to open the cooling valve to supply the cooling gas to the circulation line in an emergency mode, and in the emergency mode, the operation of the pump unit may be stopped.

Another exemplary embodiment of the present invention provides a liquid supply unit for supplying a treatment liquid, the liquid supply unit including: a housing having a space for storing the treatment liquid therein; a circulation line coupled to the housing to circulate the treatment liquid in the housing; a heater unit installed in the circulation line to heat the treatment liquid; a pump unit installed in the circulation line; and a drain line for discharging the treatment liquid remaining in the circulation line and including a drain valve installed.

The drain line may be connected to the circulation line between the pump unit and the heater unit.

According to the exemplary embodiment, the liquid supply unit may further include a cooling gas supply line for supplying cooling gas to the heater unit and including a cooling valve installed.

According to the exemplary embodiment, the liquid supply unit may further include a controller for controlling the liquid supply unit, in which the controller may control the valves to heat the treatment liquid with the heater unit while circulating the treatment liquid in the housing through the circulation line in a state in which the drain valve is closed in a normal mode, and to change a state of the drain valve to an open state to discharge the treatment liquid remaining in the circulation line to the drain line in an emergency mode, and the emergency mode is in which the operation of the pump unit may be stopped.

According to the exemplary embodiment, the liquid supply unit may further include a controller for controlling the liquid supply unit, in which the controller may control the valves to heat the treatment liquid with the heater unit while circulating the treatment liquid in the housing through the circulation line in a state in which the drain valve is closed in a normal mode, and to change a state of the drain valve to an open state to discharge the treatment liquid remaining in the circulation line to the drain line, and to open the cooling valve to supply the cooling gas to the circulation line in an emergency mode.

Still another exemplary embodiment of the present invention provides a method of treating a substrate, the method including: adjusting a temperature of a treatment liquid by heating the treatment liquid with a heater unit installed in the circulation line while circulating the treatment liquid in a housing of a tank through a circulation line coupled to the housing; treating a substrate by supplying a temperature-controlled treatment liquid to the substrate in a normal mode; and discharging a treatment liquid in the circulation line to the outside of the circulation line through a drain line connected to the circulation line in an emergency mode.

According to the exemplary embodiment, an operation of the pump unit installed in the circulation line may be stopped in the emergency mode, and in the emergency mode, cooling gas may be supplied to the circulation line to cool the pump unit with the cooling gas.

According to the exemplary embodiment, the drain line may be connected to the circulation line between the pump unit and the heater unit.

According to the exemplary embodiment, the treatment liquid may contain phosphoric acid.

According to the exemplary embodiment of the present invention, even when an emergency situation occurs in the supply tank, it is possible to prevent the liquid from being heated to a high temperature by the residual heat of the heater.

Further, according to the exemplary embodiment of the present invention, when an emergency situation occurs in the supply tank, it is possible to prevent the components in the supply tank from being damaged by the treatment liquid heated to a high temperature.

The effect of the present invention is not limited to the foregoing effects, and those skilled in the art may clearly understand non-mentioned effects from the present specification and the accompanying drawings.

DETAILED DESCRIPTION

Figure 1:
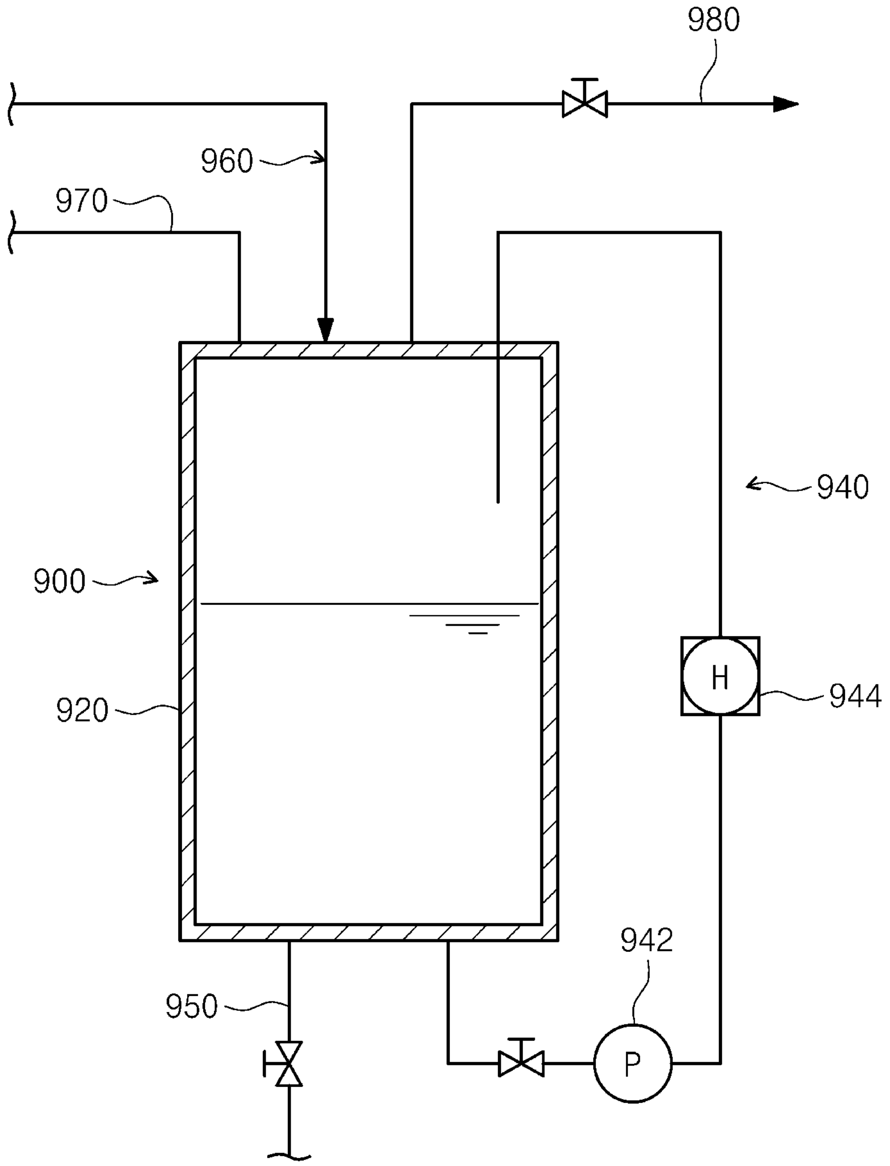
FIG. 1 is a diagram schematically illustrating a structure of a general liquid supply unit.

Hereinafter, an exemplary embodiment of the present invention will be described in more detail with reference to the accompanying drawings. The exemplary embodiment of the present invention may be modified in various forms, and the scope of the present invention should not be construed as being limited to the following exemplary embodiments. This exemplary embodiment is provided to more completely explain the present invention to those of ordinary skill in the art. Therefore, the shapes of elements in the drawings are exaggerated to emphasize a clearer description.

Figure 2:
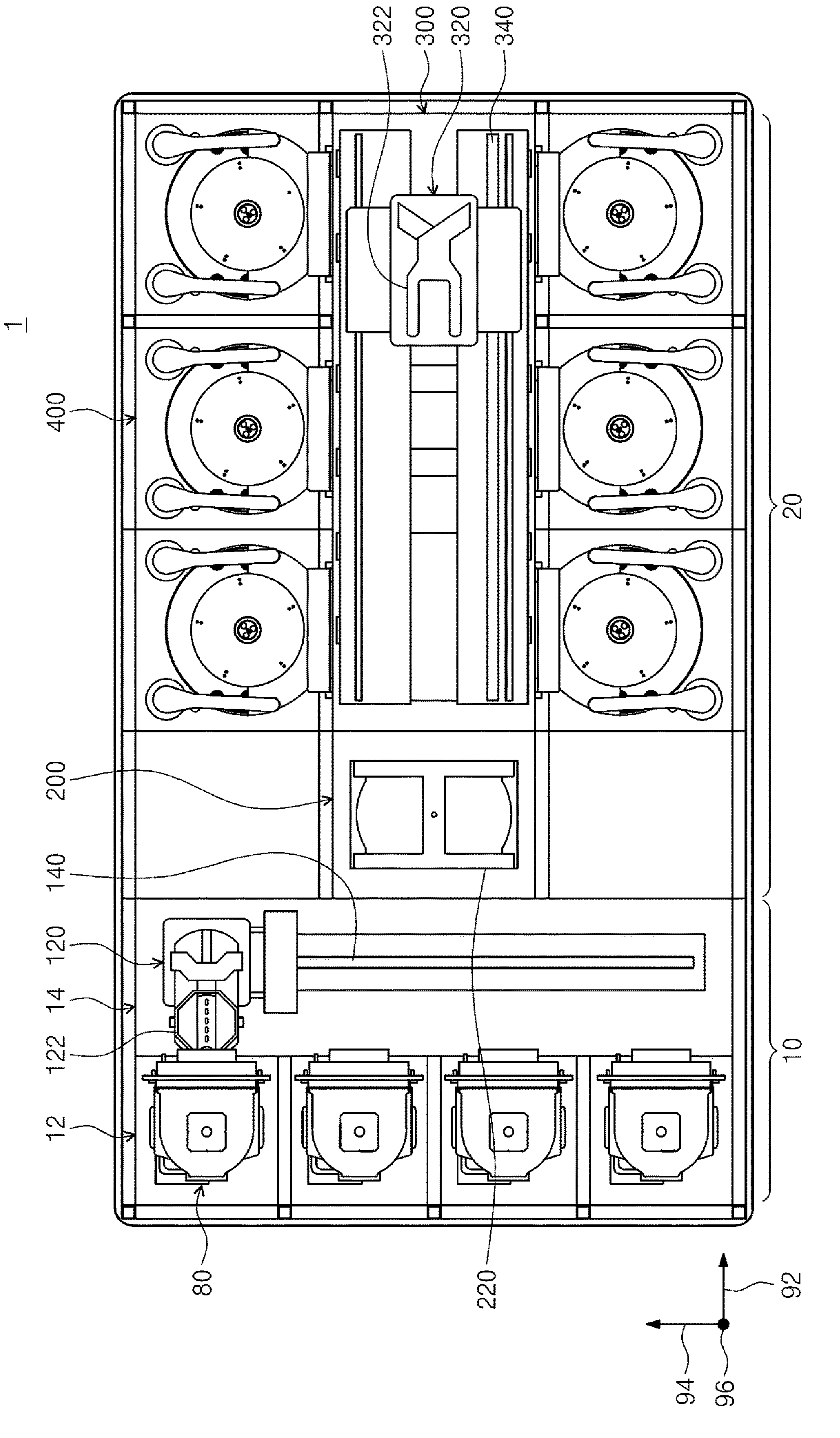
FIG. 2 is a top plan view schematically illustrating a substrate treating apparatus according to an exemplary embodiment of the present invention.

FIG. 2 is a top plan view schematically illustrating a substrate treating apparatus according to an exemplary embodiment of the present invention.

Referring to FIG. 2, a substrate treating apparatus includes an index module 10, a treating module 20, and a controller 30. According to the exemplary embodiment, the index module 10 and the treating module 20 are disposed along one direction. Hereinafter, the direction in which the index module 10 and the treating module 20 are disposed is referred to as a first direction 92, and when viewed from above, a direction vertical to the first direction 92 is referred to as a second direction 94, and a direction vertical to both the first direction 92 and the second direction 94 is referred to as a third direction 96.

The index module 10 transfers a substrate W from a container 80 in which the substrate W is accommodated to the treating module 20, and makes the substrate W, which has been completely treated in the treating module 20, be accommodated in the container 80. A longitudinal direction of the index module 10 is provided in the second direction 94. The index module 10 includes a load port 12 and an index frame 14. Based on the index frame 14, the load port 12 is located at a side opposite to the treating module 20. The container 80 in which the substrates W are accommodated is placed on the load port 12. The load port 12 may be provided in plurality, and the plurality of load ports 12 may be disposed in the second direction 94.

As the container 80, an airtight container, such as a Front Open Unified Pod (FOUP), may be used. The container 80 may be placed on the load port 12 by a transport means (not illustrated), such as an overhead transfer, an overhead conveyor, or an automatic guided vehicle, or an operator.

An index robot 120 is provided to the index frame 14. A guide rail 140 of which a longitudinal is the second direction 94 is provided within the index frame 14, and the index robot 120 may be provided to be movable on the guide rail 140. The index robot 120 includes a hand 122 on which the substrate W is placed, and the hand 122 may be provided to be movable forward and backward, rotatable based on the third direction 96 as an axis, and movable in the third direction 96. A plurality of hands 322 are provided to be spaced apart in the vertical direction, and the hands 322 may move forward and backward independently of each other.

The treating module 20 includes a buffer unit 200, a transfer chamber 300, and a treating chamber 400. The buffer unit 200 provides a space in which the substrate W loaded to the treating module 20 and the substrate W unloaded from the treating module 20 stay temporarily. The treating chamber 400 performs a treatment process of liquid-treating the substrate W by supplying a liquid onto the substrate W. The transfer chamber 300 transfers the substrate W between the buffer unit 200 and the liquid treating chamber 400.

The transfer chamber 300 may be provided so that a longitudinal direction is the first direction 92. The buffer unit 200 may be disposed between the index module 10 and the transfer chamber 300. A plurality of liquid treating chambers 400 is provided and may be disposed on the side of the transfer chamber 300. The liquid treating chamber 400 and the transfer chamber 300 may be disposed in the second direction 94. The buffer unit 220 may be located at one end of the transfer chamber 300.

According to the example, the liquid treating chambers 400 are respectively disposed on both sides of the transfer chamber 300. At each of both sides of the transfer device 300, the liquid treating devices 400 may be provided in an array of A×B (each of A and B is 1 or a natural number larger than 1) in the first direction 92 and the third direction 96.

The transfer chamber 300 has a transfer robot 320. A guide rail 340 having a longitudinal direction in the first direction 92 is provided in the transfer chamber 300, and the transfer robot 320 may be provided to be movable on the guide rail 340. The transfer robot 320 includes a hand 322 on which the substrate W is placed, and the hand 322 may be provided to be movable forward and backward, rotatable based on the third direction 96 as an axis, and movable in the third direction 96. A plurality of hands 322 are provided to be spaced apart in the vertical direction, and the hands 322 may move forward and backward independently of each other.

The buffer unit 200 includes a plurality of buffers 220 on which the substrate W is placed. The buffers 220 may be disposed while being spaced apart from each other in the third direction 96. A front face and a rear face of the buffer unit 200 are opened. The front face is a face facing the index module 10, and the rear face is a face facing the transfer chamber 300. The index robot 120 may approach the buffer unit 200 through the front face, and the transfer robot 320 may approach the buffer unit 200 through the rear face.

Figure 3:
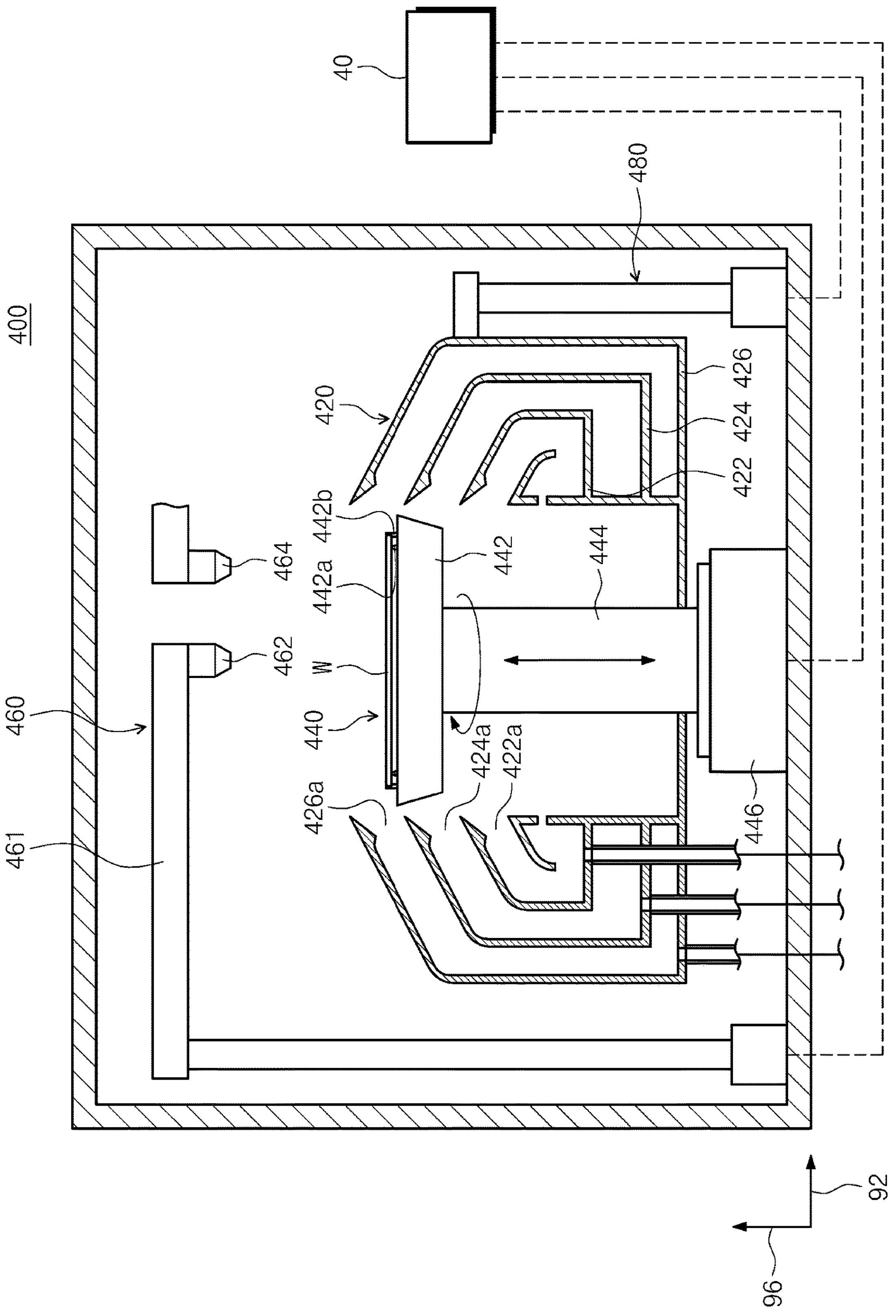
FIG. 3 is a diagram schematically illustrating an exemplary embodiment of a liquid treating chamber of FIG. 2.

FIG. 3 is a diagram schematically illustrating an exemplary embodiment of the liquid treating chamber 400 of FIG. 2. Referring to FIG. 3, the liquid treating chamber 400 includes a housing 410, a cup 420, a support unit 440, a nozzle unit 460, a lifting unit 480, a supply unit, and a controller.

The housing 410 is provided in a generally rectangular parallelepiped shape. The cup 420, the support unit 440, and the liquid supply unit 460 are disposed in the housing 410.

The cup 420 has a treatment space with an open top, and the substrate W is liquid-treated in the treatment space. The support unit 440 supports the substrate W in the treatment space. The liquid supply unit 460 supplies the liquid onto the substrate W supported by the support unit 440. The liquid may be provided in a plurality of types, and may be sequentially supplied onto the substrate W. The lifting unit 480 adjusts a relative height between the cup 420 and the support unit 440.

According to one example, the cup 420 includes a plurality of recovery containers 422, 424, and 426. Each of the recovery containers 422, 424, and 426 has a recovery space of recovering the liquid used for the treatment of the substrate. Each of the recovery containers 422, 424, and 426 is provided in a ring shape surrounding the support unit 440. When the liquid treatment process is in progress, the treatment liquid scattered by the rotation of the substrate W may be introduced into the recovery space through inlets 422*a*, 424*a*, and 426*a* of the respective recovery containers 422, 424, and 426 to be described later. According to one example, the cup 420 includes the first recovery container 422, the second recovery container 424, and the third recovery container 426. The first recovery container 422 is disposed to surround the support unit 440, the second recovery container 424 is disposed to surround the first recovery container 422, and the third recovery container 426 is disposed to surround the second recovery container 424. The second inlet 424*a* through which the liquid is introduced to the second recovery container 424 may be located above the first inlet 422*a* through which the liquid is introduced to the first recovery container 422, and the third inlet 426*a* through which the liquid is introduced to the third recovery container 426 may be located above the second inlet 424*a*.

The support unit 440 includes a support plate 442 and a driving shaft 444. An upper surface of the support plate 442 may be provided in a generally circular shape, and may have a diameter larger than a diameter of the substrate W. A support pin 442*a* supporting the rear surface of the substrate W is provided to a center portion of the support plate 442, and an upper end of the support pin 442*a* is provided to protrude from the support plate 442 so that the substrate W is spaced apart from the support plate 442 by a predetermined distance. A chuck pin 442*b* is provided to an edge of the support plate 442. The chuck pin 442*b* is provided to protrude upward from the support plate 442, and supports the lateral portion of the substrate W so that the substrate W is not separated from the support unit 440 when the substrate W is rotated. The driving shaft 444 is driven by the driver 446, is connected to the center of the bottom surface of the substrate W, and rotates the support plate 442 based on the central axis thereof.

The nozzle unit 460 has a first nozzle 462 and a second nozzle 464. The first nozzle 462 supplies the treatment liquid onto the substrate W. The treatment liquid may be a liquid having a temperature higher than room temperature. According to an example, the treatment liquid may be an aqueous phosphoric acid solution. The aqueous phosphoric acid solution may be a mixture of phosphoric acid and water. Optionally, the aqueous phosphoric acid solution may further contain other substances. For example, the other material may be silicon. Alternatively, the treatment liquid may be a liquid containing sulfuric acid. For example, the treatment liquid may be a sulfur peroxide mixture. The second nozzle 464 supplies water onto the substrate W. The water may be pure water or deionized water.

The first nozzle 462 and the second nozzle 464 are respectively supported on different arms 461, and these arms 461 may be moved independently. Optionally, the first nozzle 462 and the second nozzle 464 may be mounted on the same arm and moved at the same time.

Optionally, the liquid supply unit may further include one or more nozzles in addition to the first nozzle 462 and the second nozzle 464. Additional nozzles may supply different types of treatment liquids to the substrate. For example, the other type of treatment liquid may be an acid solution or a base solution for removing foreign substances on the substrate. In addition, another type of treatment liquid may be alcohol having surface tension lower than that of water. For example, the alcohol may be isopropyl alcohol.

The lifting unit 480 moves the cup 420 in the vertical direction. By the vertical movement of the cup 420, a relative height between the cup 420 and the substrate W is changed. Accordingly, since the recovery containers 422, 424, and 426 for recovering the treatment liquid are changed according to the type of the liquid supplied to the substrate W, the liquids may be separated and collected. Unlike the description, the cup 420 may be fixedly installed, and the lifting unit 480 may move the support unit 440 in the vertical direction.

The liquid supply unit 1000 supplies the treatment liquid to the first nozzle 462. Hereinafter, the case in which the treatment liquid is an aqueous phosphoric acid solution will be described as an example.

Figure 4:
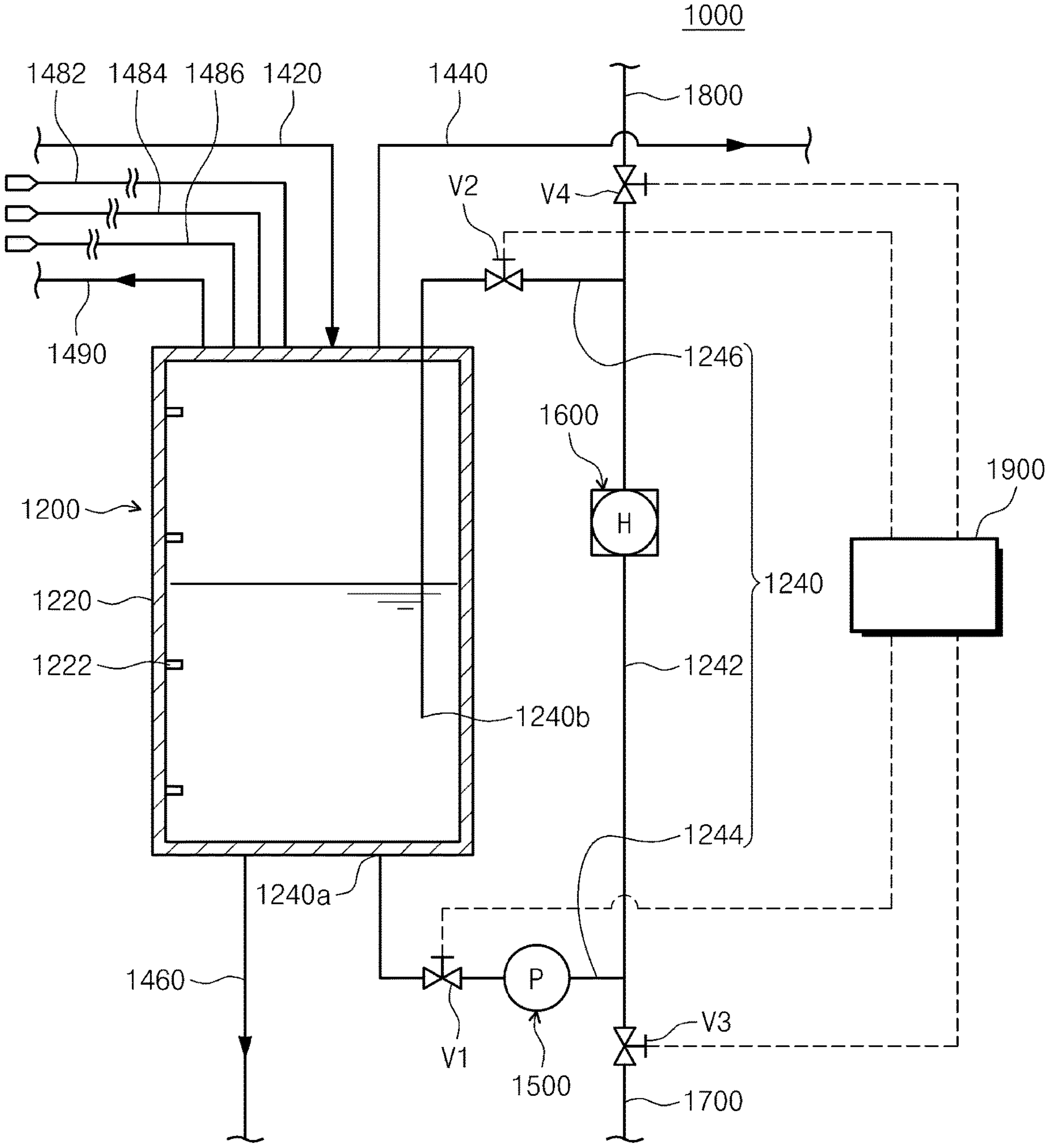
FIG. 4 is a diagram schematically illustrating an example of a liquid supply unit according to an exemplary embodiment of the present invention.

FIG. 4 is a diagram schematically illustrating an example of the liquid supply unit according to the exemplary embodiment of the present invention. Referring to FIG. 4, the liquid supply unit 1000 includes a supply tank 1200. The supply tank 1200 includes a housing 1220 and a circulation line 1240.

The housing 1220 is provided in a rectangular parallelepiped or cylindrical shape. The housing 1220 has a space in which the aqueous phosphoric acid solution is stored.

An inlet line 1420 and an outlet line 1440 are connected to the housing 1220. A valve (not illustrated) is installed in each of the inlet line 1420 and the outlet line 1440. The aqueous phosphoric acid solution is introduced into the housing 1220 through the inlet line 1420. The aqueous phosphoric acid solution may be introduced into the housing 1220 through the inlet line 1420 at a temperature lower than a set temperature used for substrate treatment. In addition, the aqueous phosphoric acid solution may be introduced into the housing 1220 through the inlet line 1420 at a concentration lower than the set concentration of phosphoric acid used for substrate treatment. Optionally, the aqueous phosphoric acid solution may be introduced into the housing 1220 through the inlet line 1420 in a state of being controlled to a set temperature and a set concentration. The treatment liquid whose temperature and concentration are controlled is supplied from the housing 1220 to the outside through the outlet line 1440. Each of the inlet line 1420 and the outlet line 1440 may be coupled to the housing 1220 through an upper wall of the housing 1220.

A waste liquid line 1460 is connected to the housing 1220. A valve (not illustrated) is installed in the waste liquid line 1460. When the aqueous phosphoric acid solution is discarded after being reused a certain number of times or for a certain period of time, the aqueous phosphoric acid solution in the housing 1220 is discharged to the outside of the housing 1220 through the waste liquid line 1460.

A phosphoric acid replenishment line 1482 and a water replenishment line 1484 may be connected to the housing 1220. A valve (not illustrated) is installed in the phosphoric acid replenishment line 1482 and the water replenishment line 1484. The phosphoric acid replenishment line 1482 may replenish phosphoric acid to the aqueous phosphoric acid solution introduced into the housing 1220, and the water replenishment line 1484 may replenish water to the phosphoric acid aqueous solution introduced into the housing 1220. Replenishment of phosphoric acid and water may be made based on the water level of the aqueous phosphoric acid solution measured by a water level measuring sensor 1222 provided in the housing 1220. Optionally, after the phosphoric acid aqueous solution is reused a certain number of times or for a certain period of time and the phosphoric acid aqueous solution is discharged from the housing 1220, phosphoric acid and water may be replenished. When the phosphoric acid aqueous solution contains silicone, a silicone replenishment line 148 may be further connected.

A vent line 1490 is connected to the housing 1220. The vent line 1490 exhausts water vapor evaporated from the aqueous phosphoric acid solution stored in the housing 1220 to the outside of the housing 1220. The vent line 1490 is coupled to the upper surface of the housing 1220. The vent line 1490 is provided with a smaller diameter than other lines. When an internal pressure of the housing 1220 is greater than or equal to a predetermined pressure, the gas in the housing 1220 may be discharged through the vent line 1490.

A circulation line 1240 is connected to the housing 1220. According to the example, one end of the circulation line 1240 functions as an inlet 1240*a* and is coupled to the bottom surface of the housing 1220. The other end of the circulation line 1240 functions as an outlet 1240*b* and is immersed in the aqueous phosphoric acid solution in the housing 1220. Optionally, the other end of the circulation line 1240 may be located higher than the water level of the aqueous phosphoric acid solution stored in the housing 1220.

A pump unit 1500 and a heater unit 1600 are mounted on the circulation line 1240. The pump unit 1500 provides a flow pressure that causes the aqueous phosphoric acid solution in the housing 1220 to flow in the circulation line 1240. The heater unit 1600 heats the aqueous phosphoric acid solution flowing in the circulation line 1240. According to the example, the heater unit 1600 is controlled to heat the aqueous phosphoric acid solution to a set temperature. The set temperature may be about 150° C. to 180° C.

Figure 5:
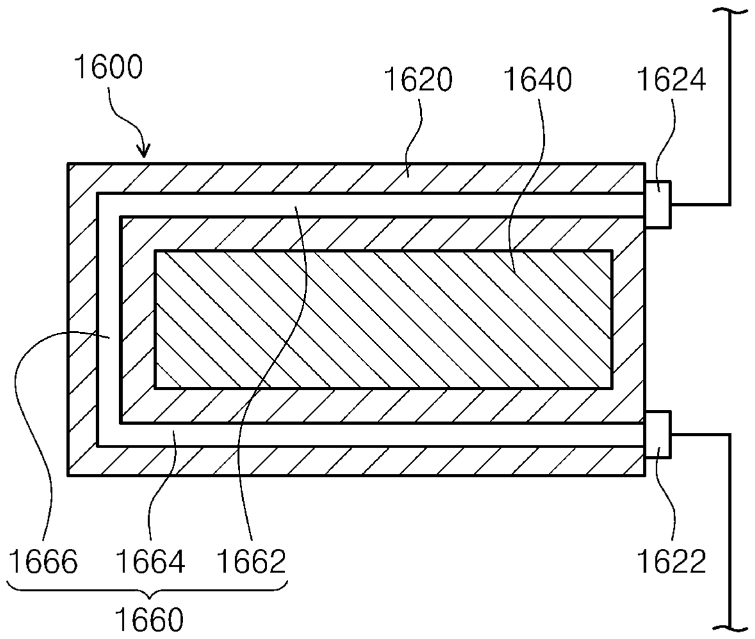
FIG. 5 is a diagram schematically illustrating an example of a heater unit of FIG. 4.

FIG. 5 is a diagram schematically illustrating the heater unit 1600.

Referring to FIG. 5, the heater unit 1600 includes a body 1620 and a heater 1640. The heater 1640 is located inside the body 1620. The body 1620 is provided with a first port 1622 and a second port 1624. The aqueous phosphoric acid solution flows into the heater unit 1600 through the first port 1622 and is discharged to the outside from the heater unit 1600 through the second port 1624. A flow path 1660 through which the aqueous phosphoric acid solution flows is formed in the body 1620. The flow path 1660 is connected to the first port 1622 and the second port 1624. According to the example, the flow path 1660 may include an inflow path 1662, an outlet path 1664, and a connection path. The first port 1622 is located at one end of the inflow path 1662, and the second port 1624 is located at one end of the outlet path 1664. The connection path 1666 connects the inflow path 1662 and the outlet path 1664. The inflow path 1662 and the outlet path 1664 may be provided to face each other. The inflow path 1662 and the outlet path 1664 may be located parallel to each other and spaced apart from each other by a predetermined distance. The heater 1640 may be located in a space surrounded by the inflow path 1662, the outlet path 1664, and the connection path 1666. The structure of the heater unit 1600 is not limited thereto and may be variously changed.

The circulation line 1240 includes a first line 1242, a second line 1244, and a third line 1246. The first line 1242 is located outside the housing 1220. According to the example, the first line 1242 may be located in a substantially vertical direction. The flow path 1660 provided in the heater unit 1600 may be provided as a part of the first line 1242. The second line 1244 includes the inlet 1240*a* of the circulation line 1240. The second line 1244 extends from the lower end of the first line 1242 and is coupled to the lower surface of the housing 1220. The third line 1246 includes the outlet 1240*b* of the circulation line 1240. The third line 1246 extends from the upper end of the first line 1242 and is coupled to the housing 1220 through the upper surface of the housing 1220. The outlet 1240*b* in the third line 1246 may be immersed in the aqueous phosphoric acid solution stored in the housing 1220. A valve V1 may be installed in the second line 1244, and a valve V2 may be installed in the third line 1246.

According to the example, the heater unit 1600 may be installed in the first line 1242, and the pump unit 1500 may be installed in the second line 1244.

A drain line 1700 is connected to the circulation line 1240. A drain valve V3 is installed in the drain line 1700. Optionally, the drain valve V3 may be provided as a three-way valve at a point where the drain line 1700 is branched from the circulation line 1240. The drain line 1700 is provided to be able to discharge the aqueous phosphoric acid solution remaining in the circulation line 1240. The drain line 1700 is connected to the circulation line 1240 upstream of the heater unit 1600. According to the example, the drain line 1700 may be connected to a point where the first line 1242 and the second line 1244 are connected. Optionally, the drain line 1700 may be connected to the first line 1242 between the above point and the first port 1622 of the heater unit 1600.

The supply tank 1200 is provided with a cooling gas supply line 1800. A cooling valve V4 is mounted on the cooling gas supply line 1800. The cooling gas cools the heater unit 1600 in an emergency mode to be described later. According to the example, the cooling gas supply line 1800 is coupled to the circulation line 1240. The cooling gas supply line 1800 may be connected to the circulation line 1240 downstream of the heater unit 1600. The cooling gas supply line 1800 may be connected to a point where the first line 1242 and the third line 1246 are connected. In this case, the cooling gas supply line 1800 is provided to supply the cooling gas in a vertical downward direction from the upper end of the first line 1242. As the cooling gas, inert gas, such as nitrogen gas, may be used. Optionally, air may be used as the cooling gas. The cooling gas may be supplied at room temperature. Optionally, the cooling gas may be supplied at a temperature lower than room temperature.

In the above-described example, each of the waste liquid line 1460 and the outlet line 1440 are illustrated as being connected to the housing 1220. However, unlike this, the waste liquid line 1460 and the outlet line 1440 may be connected to the circulation line 1240.

In addition, although not illustrated, a densitometer for measuring the concentration of phosphoric acid in the aqueous phosphoric acid solution and a thermometer for measuring the temperature of the aqueous phosphoric acid solution may be installed in the supply tank 1200. The densitometer and the thermometer may be installed in the housing 1220 or the circulation line 1240.

The controller 1900 controls the operation of each of the valves V1, V2, V3, and V4 provided in the liquid supply unit 1000. According to the example, the substrate treating apparatus 1 is operated in a normal mode and an emergency mode. During the substrate treatment, the substrate treating apparatus 1 is operated in the normal mode. During the operation in the normal mode, when a problem is detected in the substrate treating apparatus 1, the substrate treating apparatus 1 is changed to the emergency mode. For example, the substrate treating apparatus 1 may change the operation mode to the emergency mode when leakage of the treatment liquid is detected while the treatment liquid is being supplied or the supply flow rate of the treatment liquid and the concentration of the treatment liquid are out of set ranges. In addition, when the substrate treating apparatus 1 cannot be operated normally while treating the substrate, the substrate treating apparatus 1 may change the operation mode to the emergency mode state. For example, when the transfer robot cannot be operated normally, the operation mode may be changed to the emergency mode state. When the normal mode is changed to the emergency mode, the normal operation of the substrate treating apparatus 1 is stopped. In the emergency mode, the operation of the pump unit 1500 and the heater unit 1600 provided in the liquid supply unit is also stopped.

Figure 6:
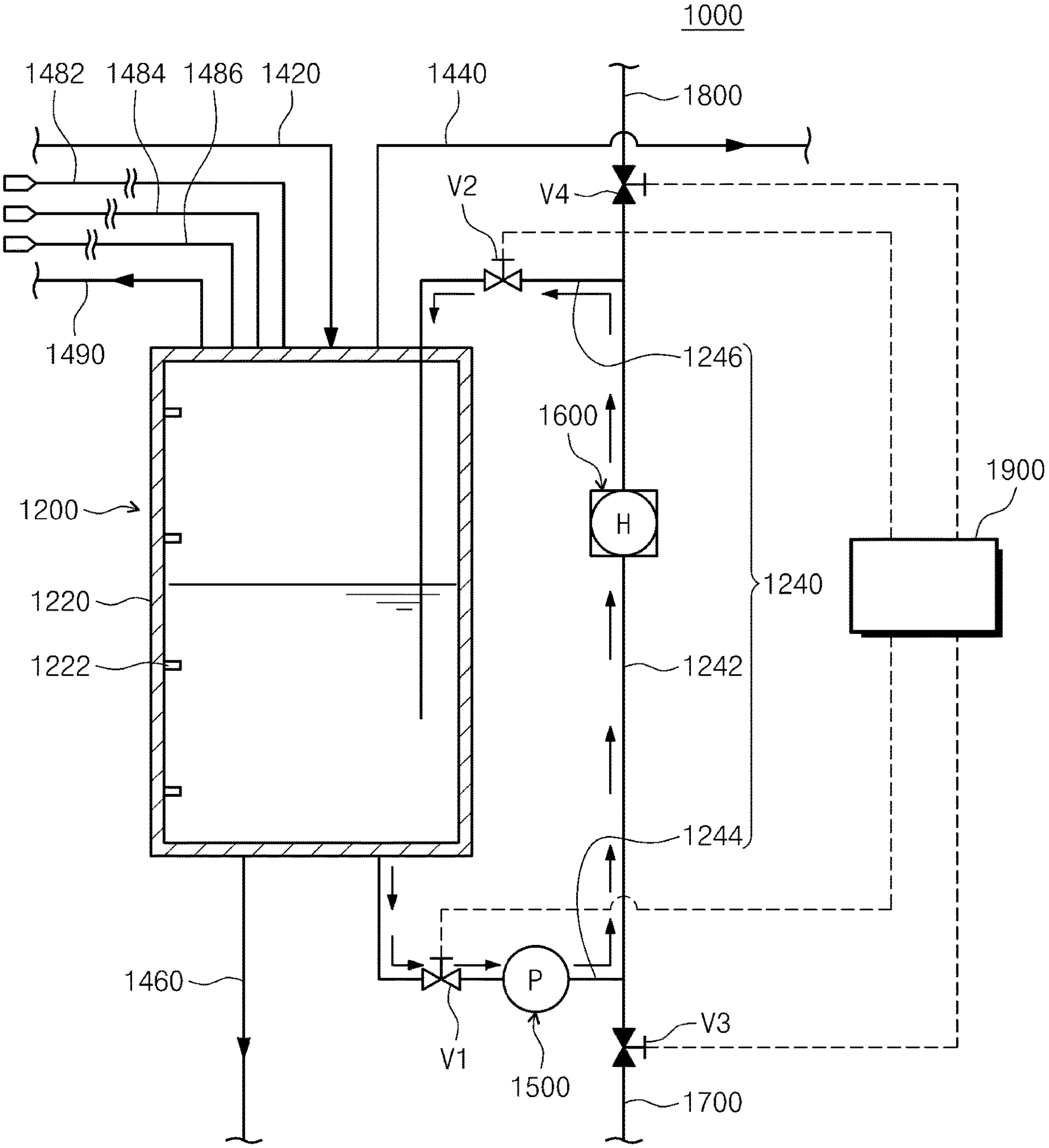
FIGS. 6 to 8 are diagrams illustrating the opening and closing states of valves provided in a supply tank and the flow of fluid in a circulation line in a normal mode and an emergency mode of the liquid supply unit of FIG. 4.
Figure 7:
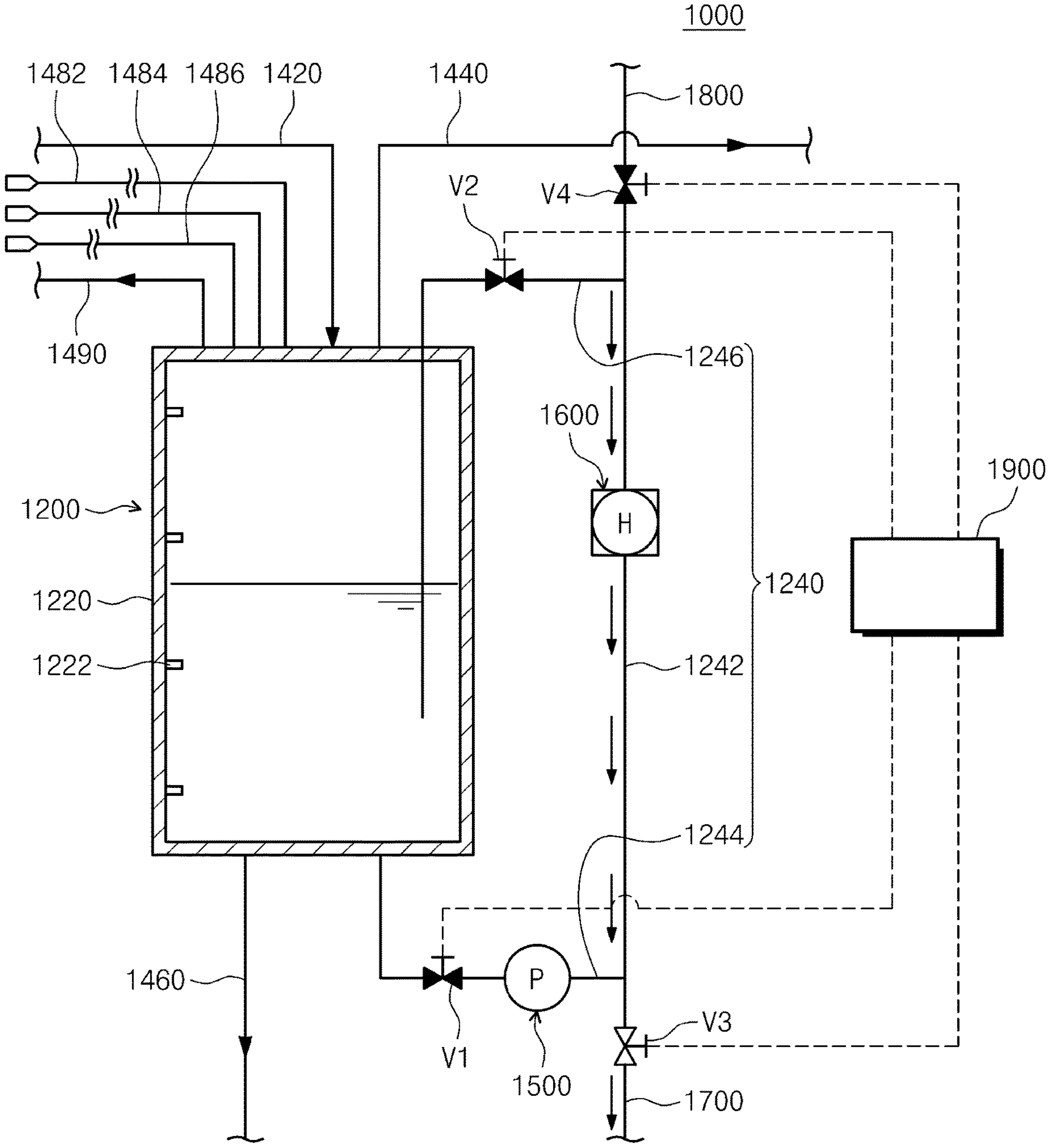
Figure 8:
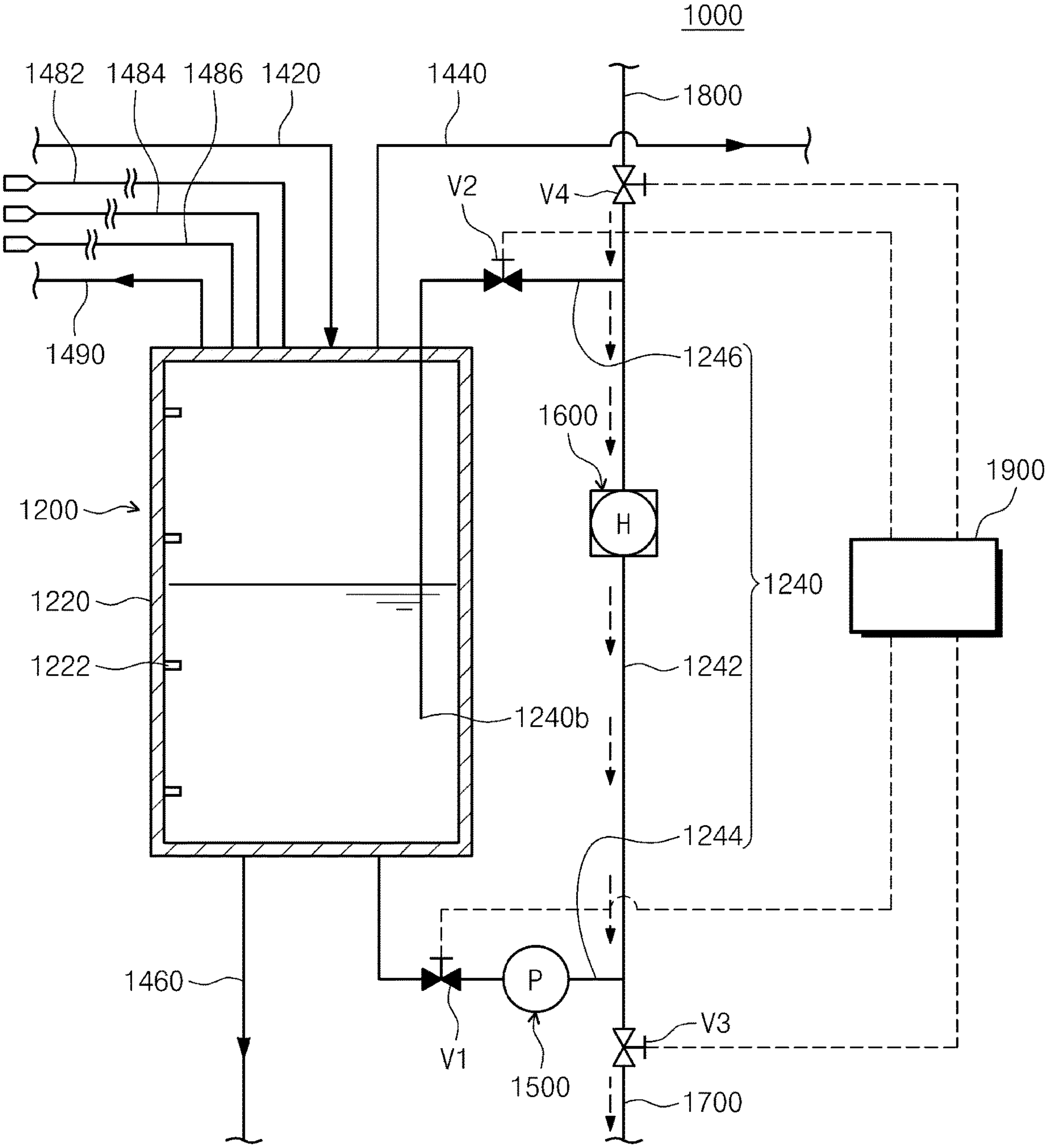

FIGS. 6 to 8 are diagrams illustrating the opening and closing states of the valves provided in the supply tank 1200 and the flow of fluid in the circulation line 1240 in the normal mode and the emergency mode. FIG. 6 is a diagram illustrating the control state of the valves in the normal mode, FIGS. 7 and 8 are diagrams illustrating the control state of the valves in the emergency mode. In FIGS. 6 to 8, a valve with an empty inside is an open state, and a valve with a filled inside is a closed state. In addition, in FIGS. 6 to 8, a solid line arrow shows the flow of the aqueous phosphoric acid solution, and a dotted line arrow shows the flow of the cooling gas.

In the normal mode, as illustrated in FIG. 6, the controller 1900 opens the valves V1 and V2 installed in the circulation line 1240, and closes the drain valve V3 installed in the drain line 1700 and the cooling valve V4 installed in the cooling gas supply line 1800. As a result, the aqueous phosphoric acid solution in the housing 1220 circulates through the circulation line 1240 and is heated by the heater 1640 during circulation.

In the emergency mode, as illustrated in FIG. 7, the controller 1900 closes the valves V1 and V2 installed in the circulation line 1240, and opens the valve V3 installed in the drain line 1700. The cooling valve V4 remains closed. Accordingly, the aqueous phosphoric acid solution remaining on the circulation line 1240 is discharged through the drain line 1700. The aqueous phosphoric acid solution remaining in the first line 1242 of the circulation line 1240 may be discharged to the drain line 1700 by its own weight. Thereafter, the controller 1900 opens the cooling valve V4 as illustrated in FIG. 8. The valves V1 and V2 installed in the circulation line 1240 are maintained in a closed state, and the drain valve V3 is maintained in an open state. Accordingly, the cooling gas is supplied from the cooling gas supply line 1800 toward the heater unit 1600. The cooling gas cools the heater unit 1600 and is discharged to the outside of the circulation line 1240 through the drain line 1700.

In the present exemplary embodiment, the aqueous phosphoric acid solution remaining in the circulation line 1240 is discharged to the outside of the circulation line 1240 in the emergency mode. Therefore, even after the operation of the heater 1640 is stopped, it is possible to prevent the aqueous phosphoric acid solution remaining in the circulation line 1240 from being heated to a high temperature by the residual heat remaining in the heater 1640. In addition, since the heater 1640 is cooled by supplying cooling gas to the circulation line 1240 in the emergency mode, it is possible to prevent damage to the components around the heater 1640 due to residual heat of the heater 1640.

In the above-described example, it has been described that the drain valve V3 is opened first and then the cooling valve V4 is opened in the emergency mode. However, unlike this, the drain valve V3 and the cooling valve V4 may be opened at the same time.

Figure 9:
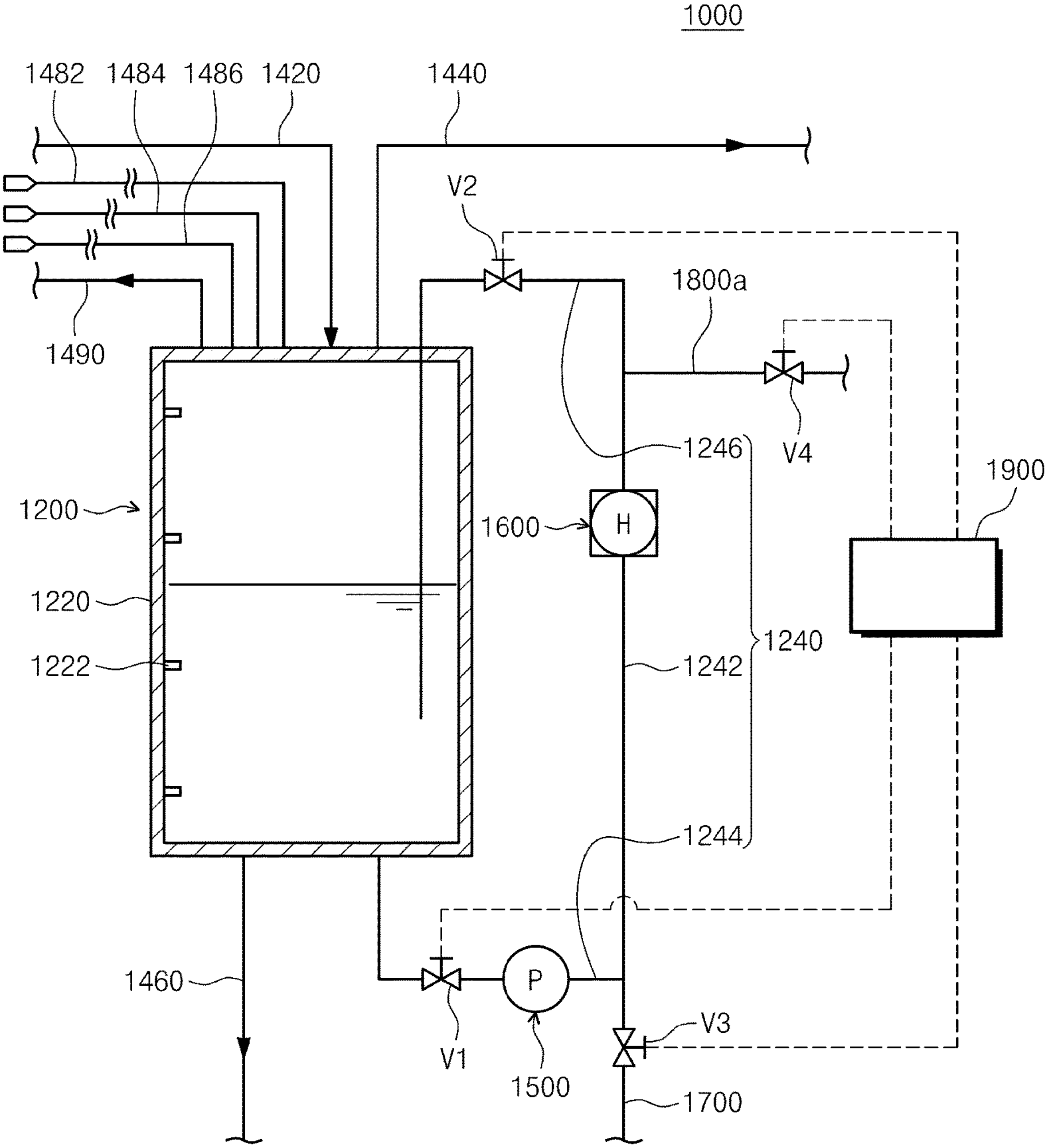
FIGS. 9 and 10 are diagrams each illustrating a modified example of a cooling gas supply line in the liquid supply unit of FIG. 4.

In FIG. 6, it has been described that the cooling gas supply line 1800 is installed at a point where the first line 1242 and the third line 1246 are connected. However, unlike this, a cooling gas supply line 1800*a* may be connected to the first line 1242 at a position adjacent to the heater unit 1600 in the downstream of the heater unit 1600. The cooling gas supply line 1800*a* may be vertically connected to the first line 1242 as illustrated in FIG. 9.

Figure 10:
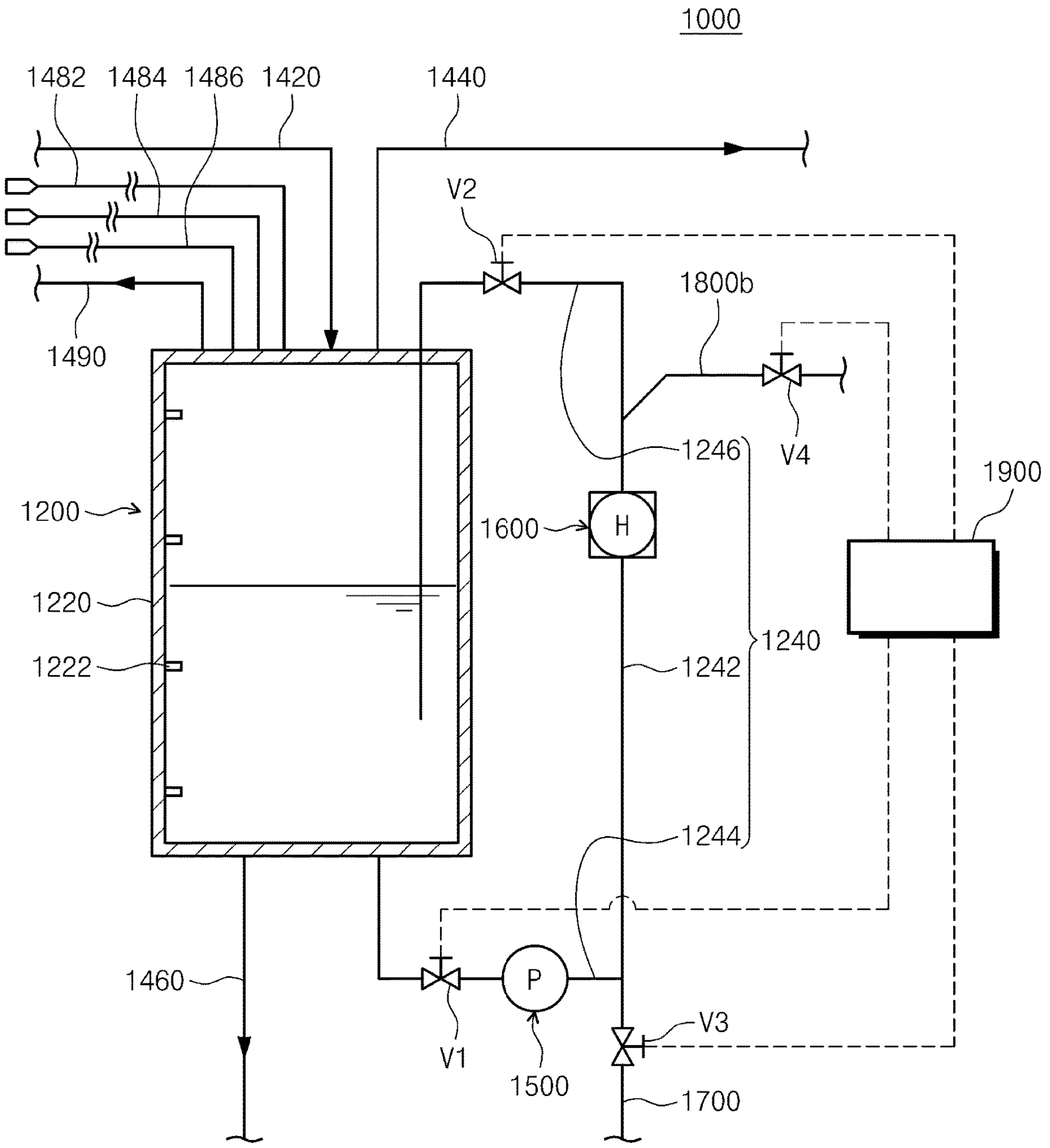

Optionally, a cooling gas supply line 1800*b* may be inclinedly connected to the first line 1242 in a direction toward the heater unit 1600 as illustrated in FIG. 10. In this case, most of the cooling gas supplied through the cooling gas supply line 1800*b* may be directly supplied in a direction toward the heater unit 1600.

Figure 11:
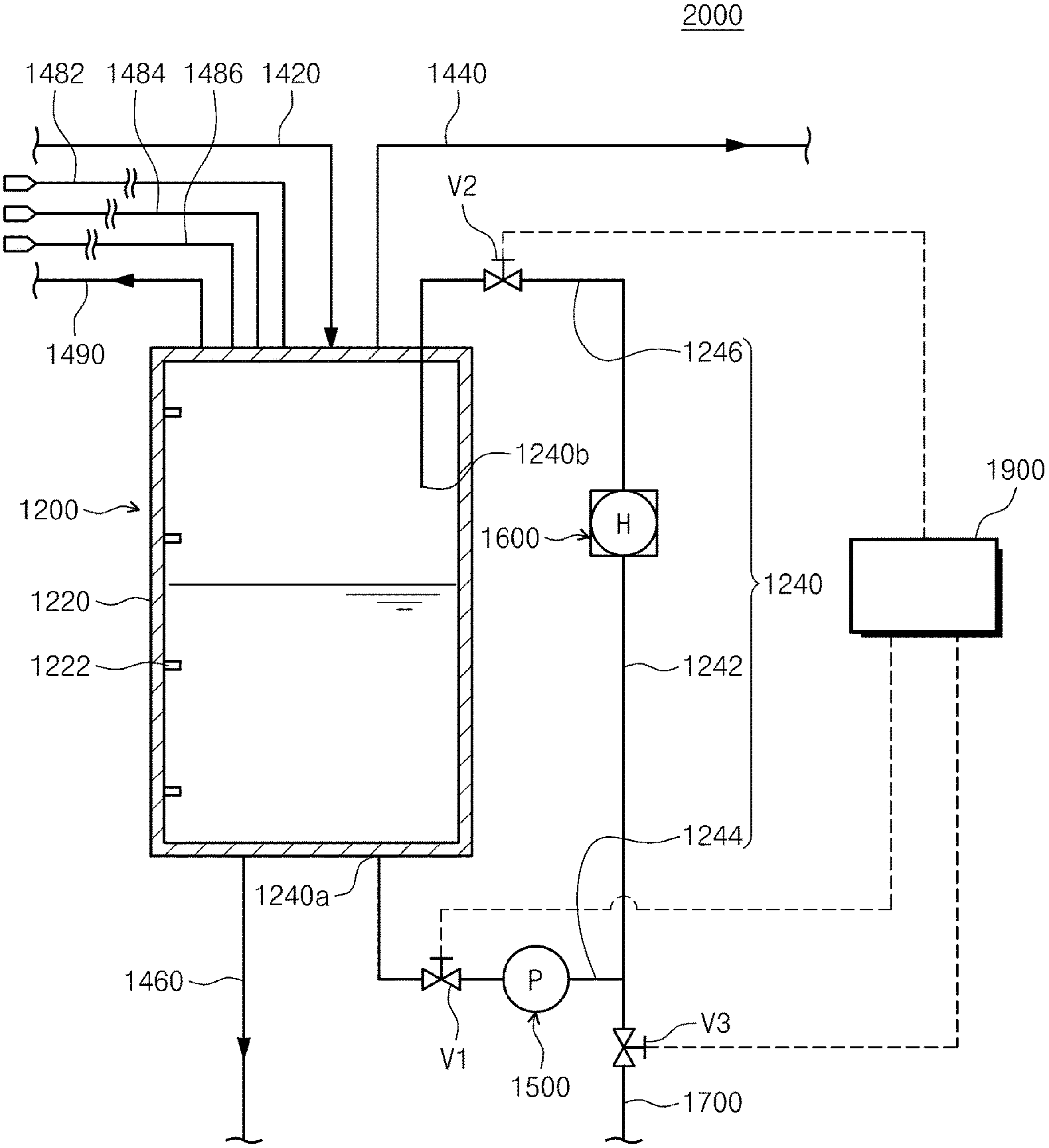
FIG. 11 is a diagram schematically illustrating another exemplary embodiment of the liquid supply unit of FIG. 4.

FIG. 11 is a diagram schematically illustrating another exemplary embodiment of the liquid supply unit of FIG. 4. Hereinafter, parts different from the exemplary embodiment of FIG. 4 will be mainly described.

A liquid supply unit 2000 of FIG. 11 is not provided with a cooling gas supply line. In addition, in the liquid supply unit of FIG. 11, the outlet 1240*b* of the third line 1246 of the circulation line 1240 is located at a position higher than the water level of the aqueous phosphoric acid solution in the housing 1220.

Figure 12:
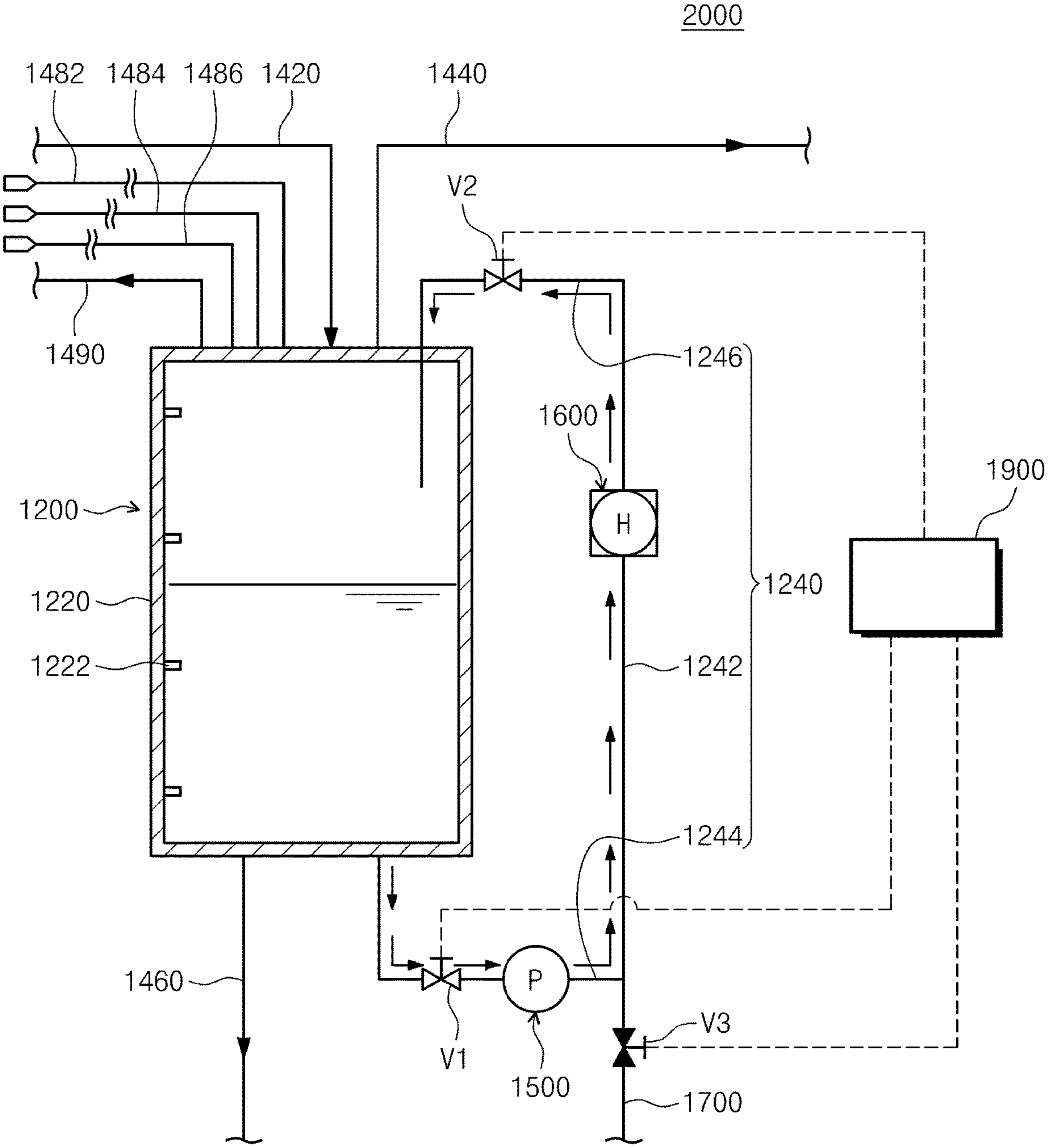
FIGS. 12 to 14 are diagrams illustrating the opening and closing states of valves provided in a supply tank and the flow of fluid in a circulation line in a normal mode and an emergency mode of the liquid supply unit of FIG. 11.
Figure 13:
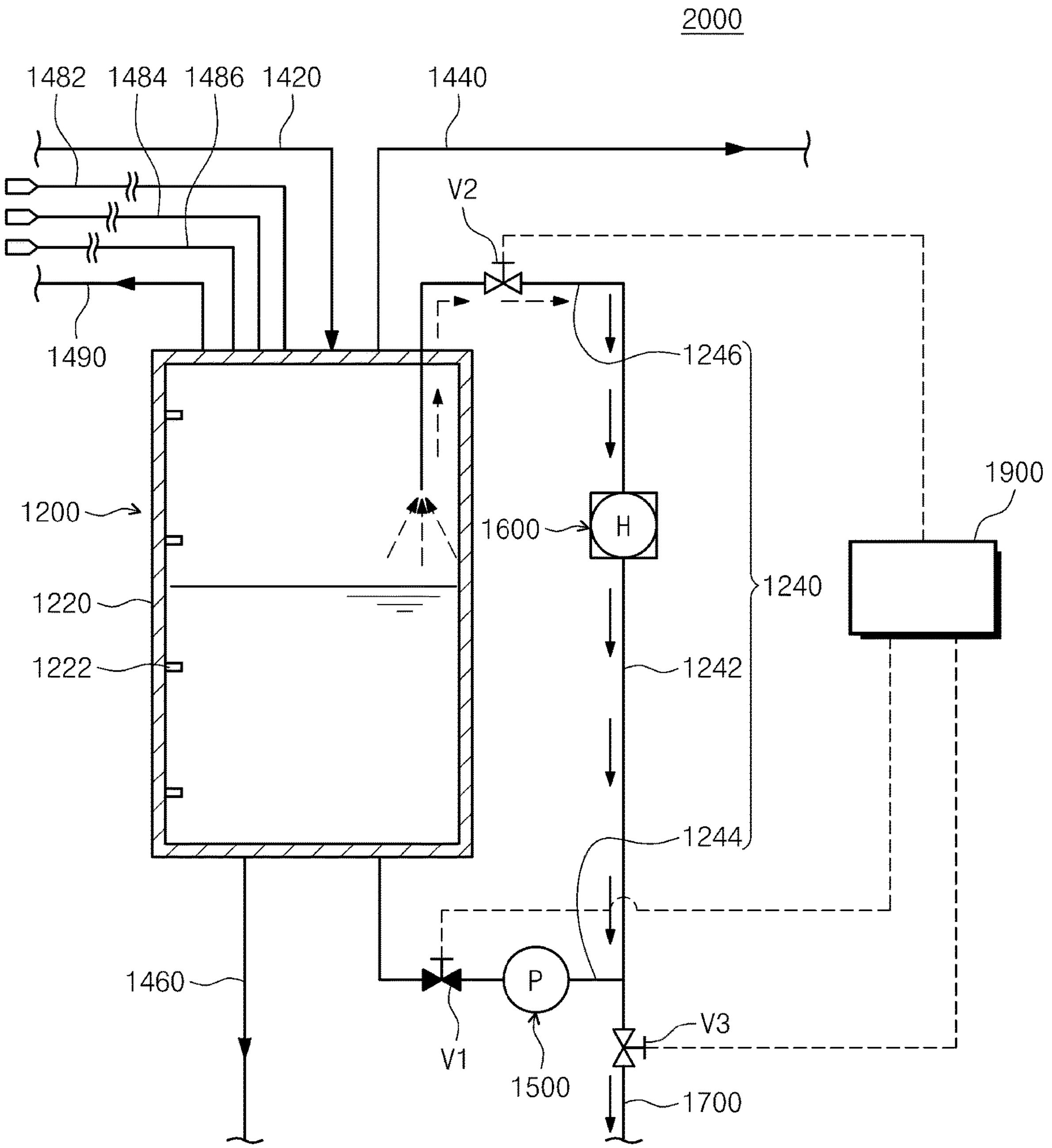
Figure 14:
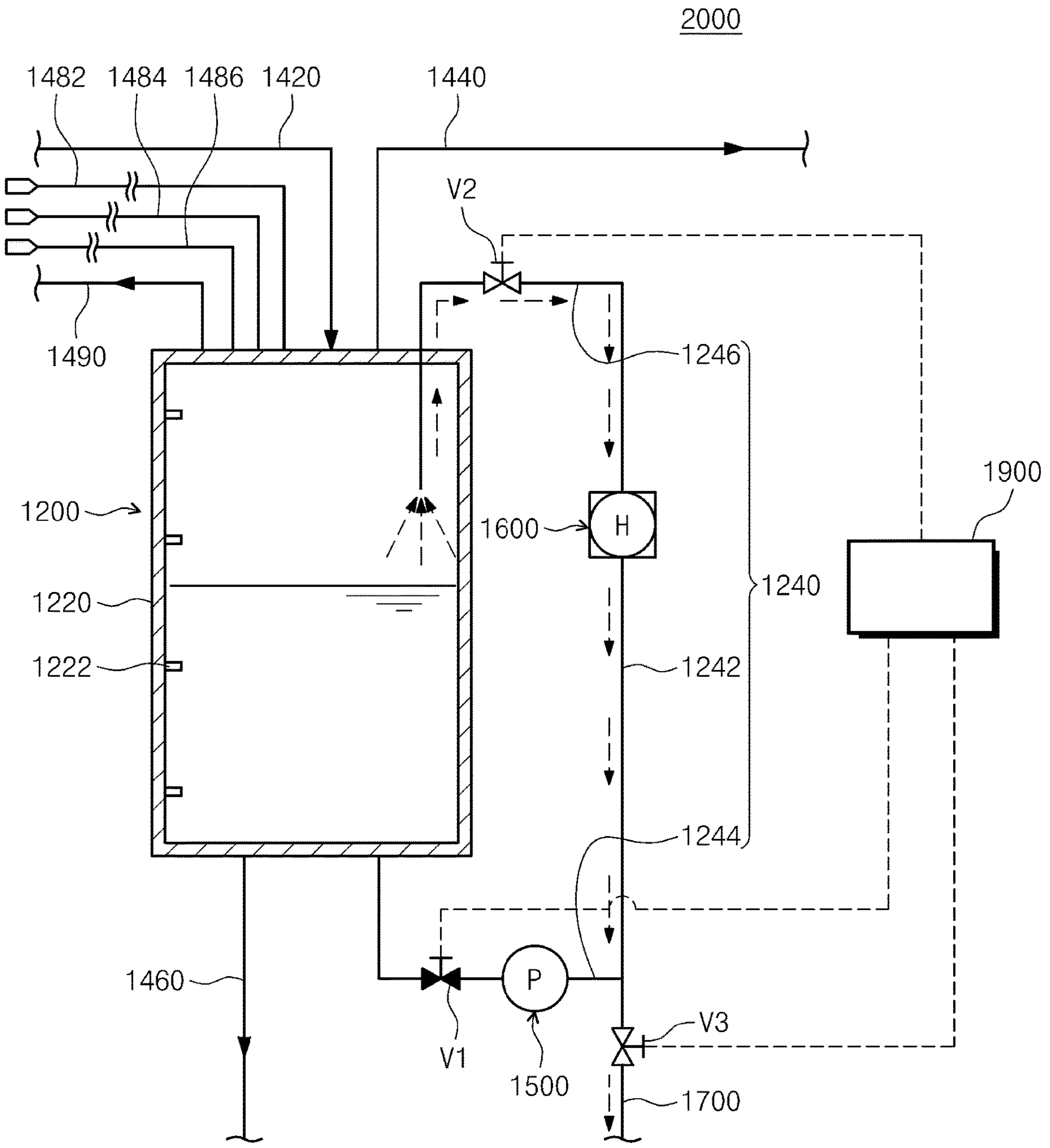

FIGS. 12 to 14 are diagrams illustrating the opening and closing states of valves provided in the supply tank 1200 and the flow of fluid in the circulation line 1240 in a normal mode and an emergency mode. FIG. 12 is a diagram illustrating the control state of the valves in the normal mode, and FIGS. 13 and 14 are diagrams illustrating the control state of the valves and the flow path of the aqueous phosphoric acid solution and gas in the emergency mode. In FIGS. 12 to 14, a valve with an empty inside is an open state, and a valve with a filled inside is a closed state. In addition, in FIGS. 12 to 14, the solid line arrow shows the flow of the aqueous phosphoric acid solution, and the dotted line arrow shows the gas flow.

In the normal mode, as illustrated in FIG. 12, the controller 1900 opens the valves V1 and V2 installed in the circulation line 1240, and closes the drain valve V3 installed in the drain line 1700. As a result, the aqueous phosphoric acid solution in the housing 1220 circulates through the circulation line 1240 and is heated by the heater 1640 during circulation.

In the emergency mode, as illustrated in FIGS. 13 and 14, the controller 1900 closes the valves V1 installed in the second line 1244 and opens the valve V3 installed in the drain line 1700. The valve V2 installed in the third line 1246 maintains an open state. Accordingly, as illustrated in FIG. 13, the aqueous phosphoric acid solution remaining on the circulation line 1240 is discharged through the drain line 1700. As the phosphoric acid aqueous solution is discharged by gravity from the circulation line 1240, the inside of the circulation line 1240 becomes a negative pressure compared to the inside of the housing 1220. Due to this, the gas remaining in the housing 1220 flows into the third line 1246 due to the pressure difference. Then, as illustrated in FIG. 14, the gas flows through the heater unit 1600 and then is discharged to the drain line 1700. In general, the temperature of the gas remaining in the housing 1220 is from about 60° C. to about 70° C., which is lower than that of the heater 1640. Accordingly, as the gas in the housing 1220 passes through the heater unit 1600, the heater unit 1600 is cooled. The gas in the housing 1220 may be air.

Figure 15:
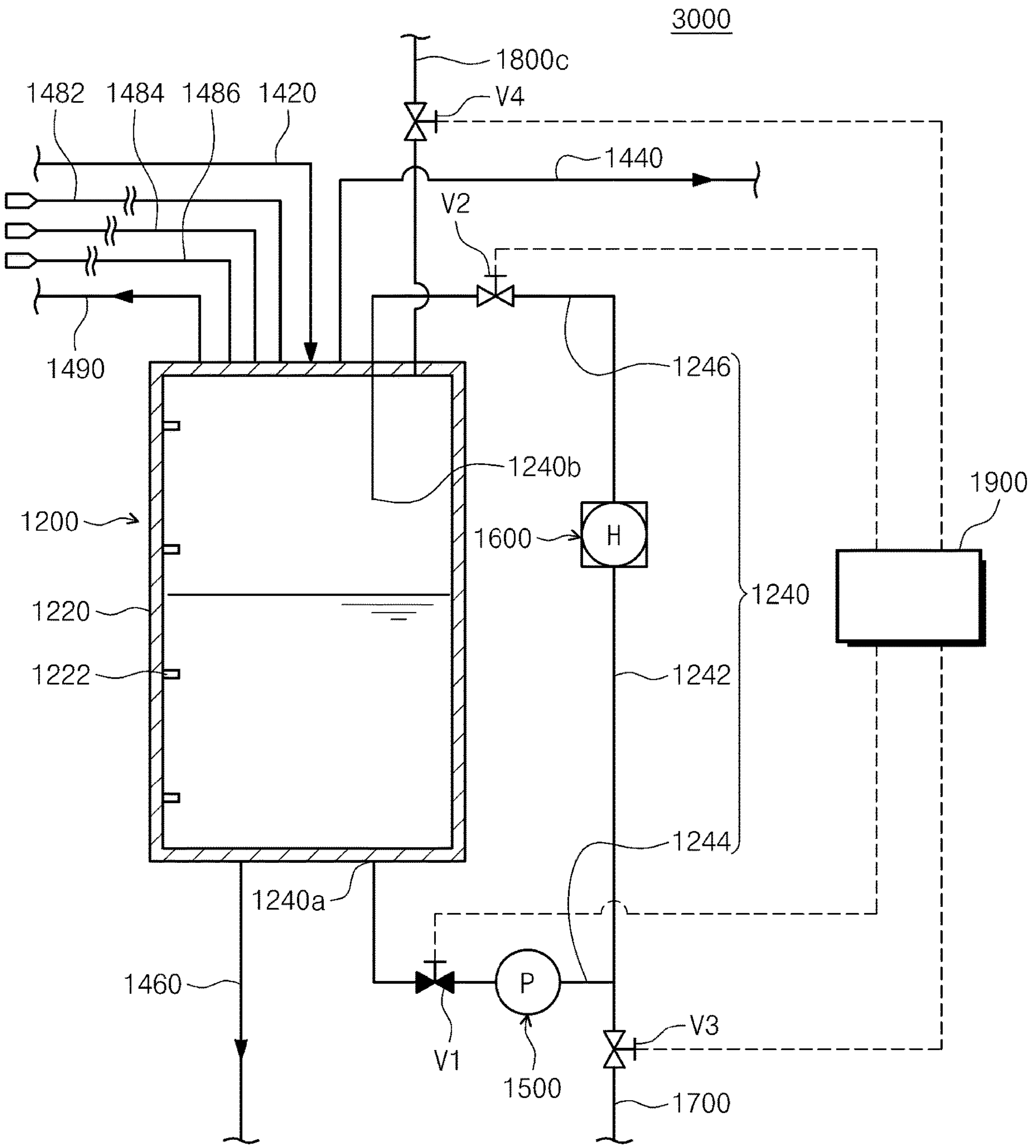
FIG. 15 is a diagram schematically illustrating still another exemplary embodiment of the liquid supply unit of FIG. 4.

FIG. 15 is a diagram schematically illustrating still another exemplary embodiment of the liquid supply unit of FIG. 4. Hereinafter, a structure different from the exemplary embodiment of FIG. 4 will be mainly described.

In the liquid supply unit 3000 of FIG. 15, the cooling gas supply line 1800*c* is coupled to the housing 1220. In addition, in the liquid supply unit 3000 of FIG. 11, an outlet of the third line 1246 of the circulation line 1240 is located at a position higher than the water level of the aqueous phosphoric acid solution in the housing 1220.

Figure 16:
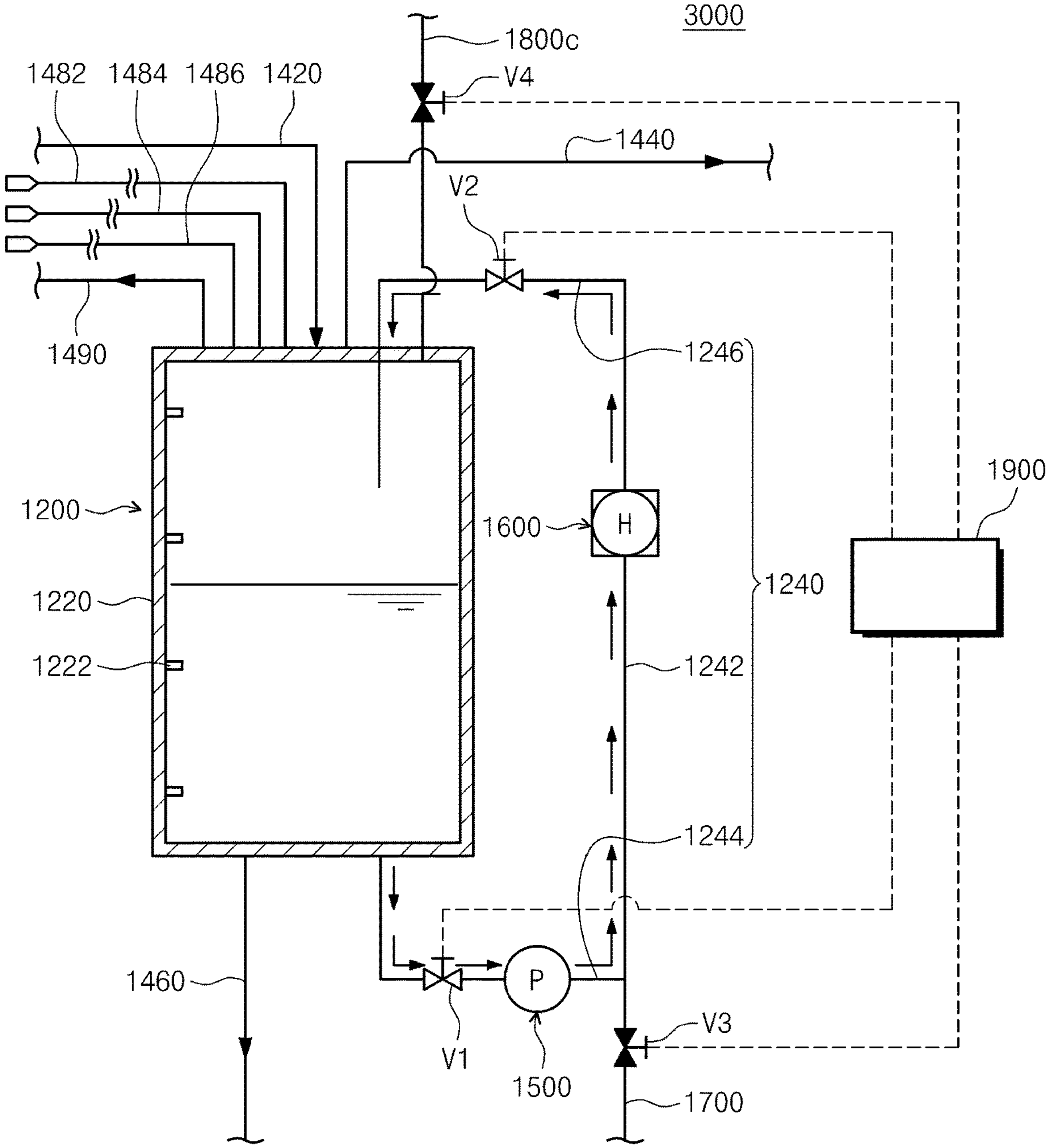
FIGS. 16 to 18 are diagrams illustrating the opening and closing states of valves provided in a supply tank and the flow of fluid in a circulation line in a normal mode and an emergency mode of the liquid supply unit of FIG. 15.
Figure 17:
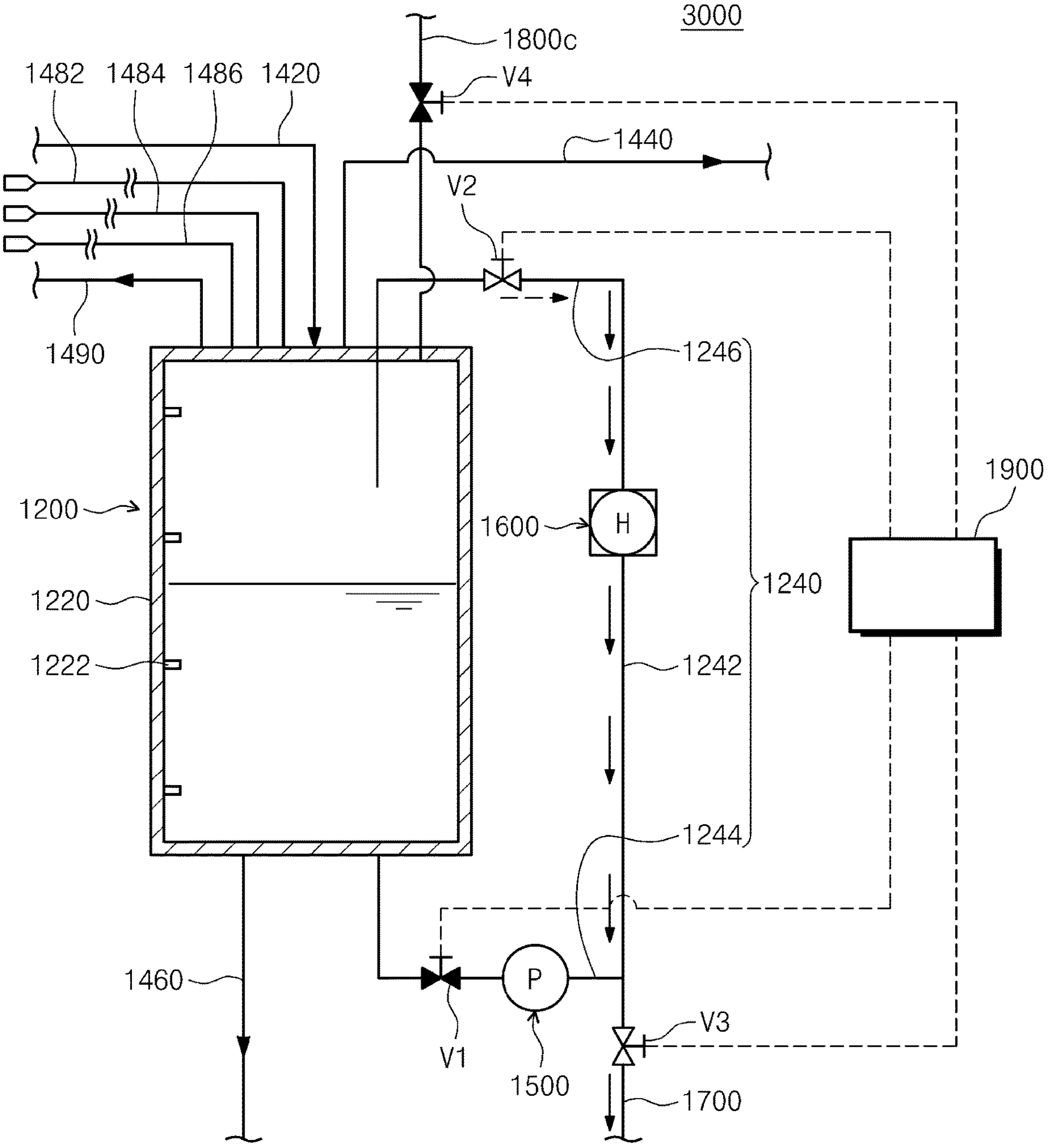
Figure 18:
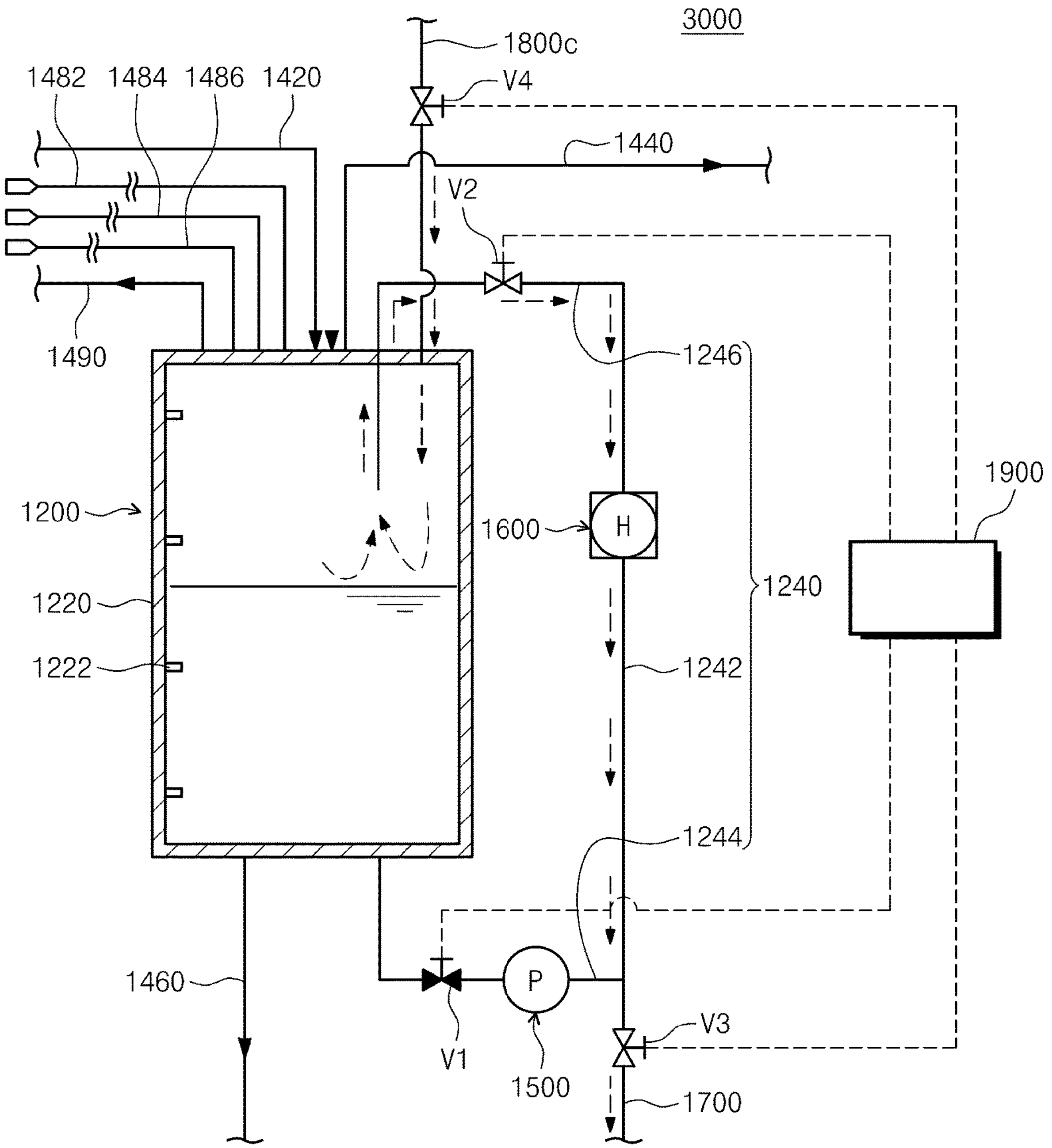

FIGS. 16 to 18 are diagrams illustrating the opening and closing states of valves provided in the supply tank 1200 and the flow of fluid in the circulation line 1240 in the normal mode and the emergency mode. FIG. 16 is a diagram illustrating the control state of the valves in the normal mode, and FIGS. 17 and 18 are diagrams illustrating the control state of the valves and the flow path of the aqueous phosphoric acid solution and gas in the emergency mode. In FIGS. 16 to 18, a valve with an empty inside is an open state, and a valve with a filled inside is a closed state. In addition, in FIGS. 16 to 18, the solid line arrow shows the flow of the aqueous phosphoric acid solution, and the dotted line arrow shows the flow of the cooling gas.

In the normal mode, as illustrated in FIG. 16, the controller 1900 opens the valves V1 and V2 installed in the circulation line 1240, and closes the drain valve V3 installed in the drain line 1700 and the cooling valve V4 installed in the cooling gas supply line 1800. As a result, the aqueous phosphoric acid solution in the housing 1220 circulates through the circulation line 1240 and is heated by the heater 1640 during circulation.

In the emergency mode, as illustrated in FIG. 17, the controller 1900 closes the valve V1 installed in the second line 1244 and opens the valve V3 installed in the drain line 1700. The valve V2 installed in the third line 1246 maintains an open state, and the cooling valve V4 maintains a closed state. Accordingly, the aqueous phosphoric acid solution remaining on the circulation line 1240 is discharged through the drainage line 1700. The aqueous phosphoric acid solution remaining in the first line 1242 of the circulation line 1240 may be discharged to the drain line 1700 by its own weight. Thereafter, the controller 1900 opens the cooling valve V4 as illustrated in FIG. 18. The valves V1 installed in the second line 1244 are maintained in a closed state, and the valve V2 and the drain valve V3 installed in the third line 1246 are maintained in an open state. Accordingly, gas is supplied into the housing 1220 from the cooling gas supply line 1800 into the housing 120. The gas supplied into the housing 1220 flows into the third line 1246, and then flows toward the heater unit 1600. The cooling gas cools the heater unit 1600 and is discharged to the outside of the circulation line 1240 through the drain line 1700.

In the above-described example, it has been described that the drain valve V3 is opened first and then the cooling valve V4 is opened in the emergency mode. However, unlike this, the drain valve V3 and the cooling valve V4 may be opened at the same time.

In the above-described example, it has been described that the cooling valve V4 is closed in the normal mode and the cooling valve V4 is opened in the emergency mode. However, unlike this, the cooling valve V4 may be opened even in the normal mode. In this case, dry air may be used as the cooling gas. In the normal mode, the dry air supplied into the housing 1220 may decrease the humidity in the housing 1220 and promote evaporation of water from the aqueous phosphoric acid solution.

In the above-described example, it has been described that the valve V1 installed in the second line 1244 is closed in the emergency mode. However, in contrast to this, in the emergency mode, the valve V1 installed in the second line 1244 may be opened.

Figure 19:
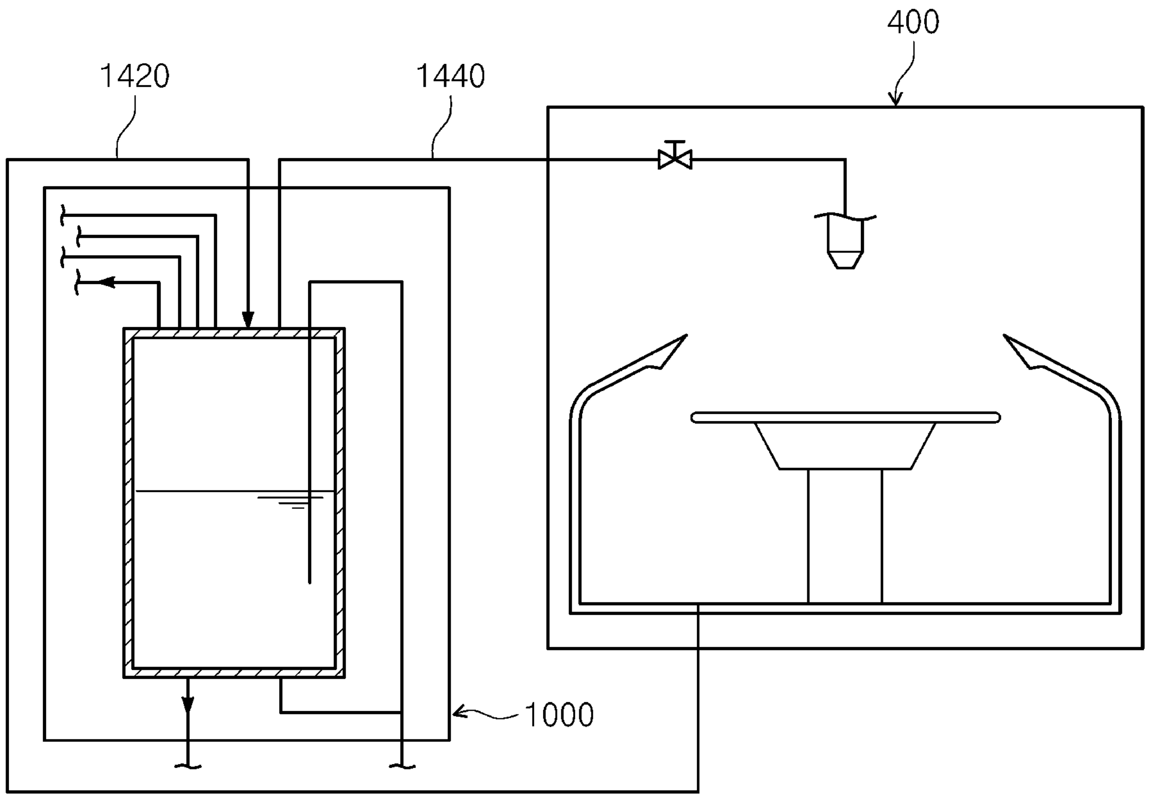
FIGS. 19 and 20 are diagrams schematically illustrating a coupling state of the liquid supply unit and the liquid treating chamber, respectively.
Figure 20:
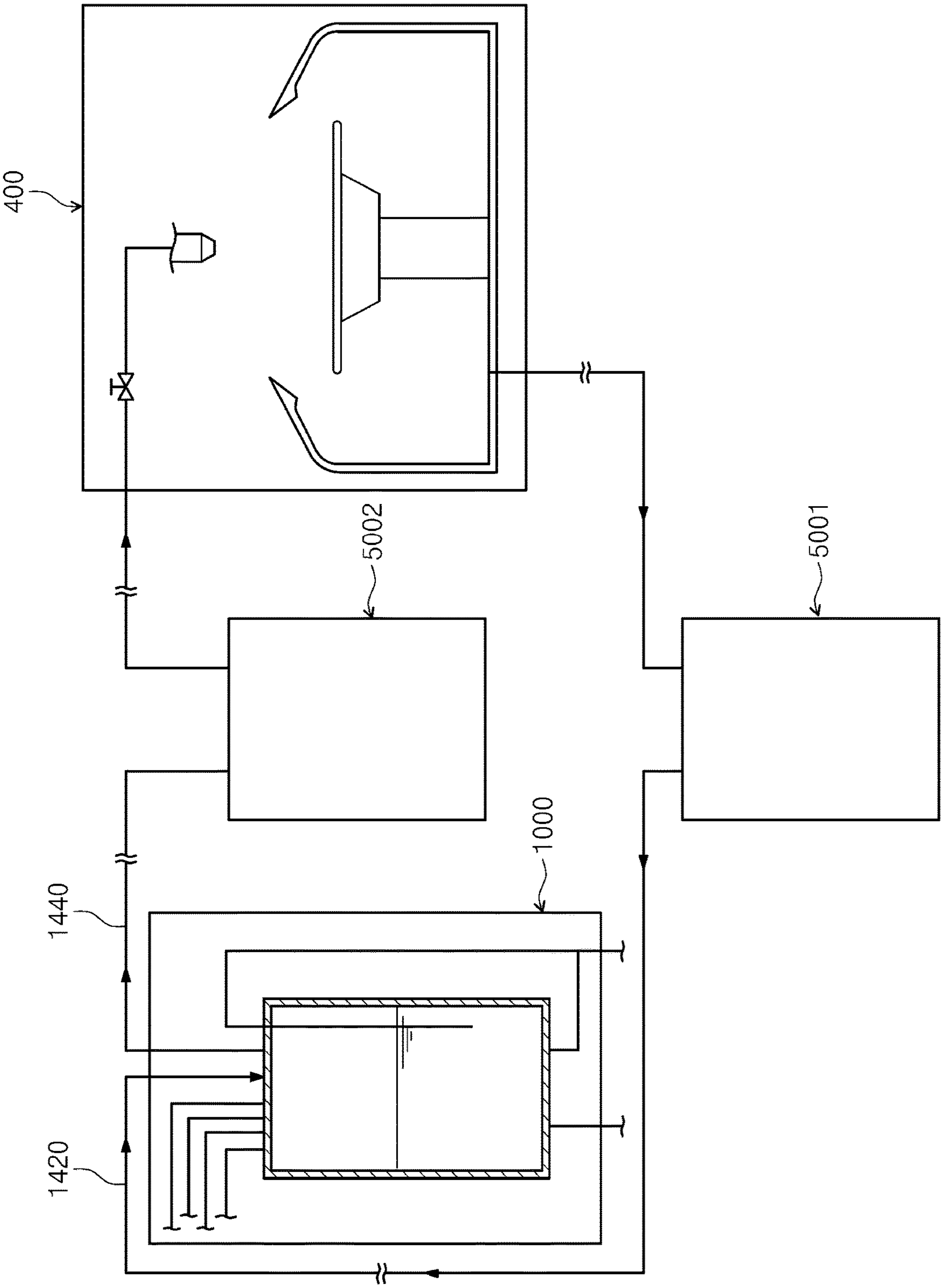

FIGS. 19 and 20 are diagrams schematically illustrating a coupling state of the liquid supply unit and the liquid treating chamber, respectively.

As illustrated in FIG. 19, the inlet line 1420 connected to the housing 1220 of the supply tank 1200 may be directly coupled to the liquid treating chamber 400. In this case, the treatment liquid used for substrate treatment in the liquid treating chamber 400 is directly recovered to the housing 1220 of the supply tank 1200. Also, the outlet line 1440 may be directly coupled to a nozzle of the liquid treatment chamber 400. In this case, the phosphoric acid aqueous solution of which the temperature and the concentration are controlled in the supply tank 1200 is directly supplied to the nozzle of the liquid treating chamber 400.

In addition, as illustrated in FIG. 20, the treatment liquid used for substrate treatment in the liquid treating chamber 400 is directly recovered to the recovery tank 5001, and thereafter, the treatment liquid may be introduced from the recovery tank 5001 to the supply tank 1200 through the inlet line 1420. In addition, the aqueous solution of phosphoric acid of which the temperature and the concentration are controlled in the supply tank 1200 may be supplied to a buffer tank 5002 through the outlet line 1440, and then the aqueous solution of phosphoric acid may be supplied from the buffer tank 5002 to the nozzle. Any one of the recovery tank 5001 and the buffer tank 5002, or the recovery tank 5001 and the buffer tank 5002 may be provided in the same as or similar structure to that of the supply tank 1200.

In the above-described example, it has been described that the treatment liquid stored in the supply tank 1200 is an aqueous phosphoric acid solution. However, alternatively, the treatment liquid stored in the supply tank 1200 may be another type of treatment liquid supplied to the substrate in a heated state. For example, the treatment liquid may be a liquid containing sulfuric acid. For example, the treatment liquid may be a mixture of sulfuric acid and hydrogen peroxide. Optionally, the treatment liquid may be a mixture of ammonium hydroxide, hydrogen peroxide, and water. Optionally, the treatment liquid may be an organic solvent, such as isopropyl alcohol.

The foregoing detailed description illustrates the present invention. In addition, the above description shows and describes the exemplary embodiments of the present invention, and the present invention may be used in various other combinations, modifications, and environments. That is, changes or modifications are possible within the scope of the concept of the invention disclosed herein, the scope equivalent to the written disclosure, and/or within the scope of skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. In addition, the appended claims should be construed to include other exemplary embodiments as well.

What is claimed is:

1. An apparatus for treating a substrate, the apparatus comprising:

a cup providing a treatment space therein;

a support unit for supporting the substrate and rotating the substrate in the treatment space;

a nozzle for supplying a treatment liquid to the substrate;

a liquid supply unit for supplying the treatment liquid to the nozzle, wherein the liquid supply unit includes:

a tank for storing the treatment liquid and including:

a housing having a space for storing the treatment liquid therein;

a circulation line including an inlet coupled to the housing and an outlet disposed within the space of the housing and configured to circulate the treatment liquid from the housing, wherein the inlet of the circulation line receives the treatment liquid in the housing, and the outlet of the circulation line returns the treatment liquid in the circulation line to the space of the housing, wherein a pump unit is installed in the circulation line;

a heater unit installed in the circulation line to heat the treatment liquid; and a drain line for discharging the treatment liquid remaining in the circulation line to an outside of the apparatus for treating the substrate and provided with a drain valve, wherein the treatment liquid remaining in the circulation line is discharged via the drain valve to the outside, wherein the drain line is connected to the circulation line between the pump unit and the heater unit; and a controller for controlling the liquid supply unit, wherein the liquid supply unit further includes:

a cooling gas supply line which supplies a cooling gas to the heater unit, and a cooling valve is installed in the cooling gas supply line, wherein the controller controls the liquid supply unit to heat the treatment liquid with the heater unit while circulating the treatment liquid in the housing through the circulation line in a state in which the drain valve is closed in a normal mode, and to change a state of the drain valve to an open state to discharge the treatment liquid remaining in the circulation line to the drain line, and to open the cooling valve to supply the cooling gas to the circulation line in an emergency mode, and wherein in the emergency mode, an operation of the pump unit is stopped.

2. The apparatus of claim 1, wherein the cooling gas supply line is coupled to the circulation line.

3. The apparatus of claim 2, wherein the cooling gas supply line is coupled to the circulation line downstream of the heater unit.

4. The apparatus of claim 3, wherein the cooling gas supply line is connected to the circulation line to supply the cooling gas in a direction toward the heater unit.

5. The apparatus of claim 1, wherein the cooling gas supply line is coupled to the housing.

6. The apparatus of claim 1, wherein the circulation line includes:

a first line of which a longitudinal direction is provided in a vertical direction;

a second line extending from the first line and connected to the housing so as to be provided upstream of the first line; and a third line extending from the first line and coupled to the housing so as to be provided downstream of the first line, wherein the pump unit is installed in the first line, wherein the cooling gas supply line is connected to the third line, and wherein the drain line is connected to the first line.

7. The apparatus of claim 1, wherein the cooling gas supply line is coupled to the housing, and a vent line for exhausting an internal atmosphere is coupled to the housing.

* * * * *